United States Patent
Her et al.

(10) Patent No.: US 10,057,483 B2
(45) Date of Patent: Aug. 21, 2018

(54) MOBILE TERMINAL AND METHOD THEREOF

(71) Applicant: LG ELECTRONICS INC., Seoul (KR)

(72) Inventors: Sooyoung Her, Seoul (KR); Inyong Hwang, Seoul (KR); Taekon Lee, Seoul (KR); Kiwan Kim, Seoul (KR); Youngjun Kim, Seoul (KR); Jinwoo Park, Seoul (KR); Samsick Kim, Seoul (KR); Younhwa Choi, Seoul (KR); Victoria Bondarchuk, Seoul (KR); Hyungsun Kim, Seoul (KR); Seulah Lee, Seoul (KR); Minhun Kang, Seoul (KR); Jungeun Shin, Seoul (KR)

(73) Assignee: LG ELECTRONICS INC., Seoul (KR)

(*) Notice: Subject to any disclaimer, the term of this patent is extended or adjusted under 35 U.S.C. 154(b) by 352 days.

(21) Appl. No.: 14/502,685

(22) Filed: Sep. 30, 2014

(65) Prior Publication Data

US 2015/0229837 A1    Aug. 13, 2015

Related U.S. Application Data

(60) Provisional application No. 61/939,225, filed on Feb. 12, 2014.

(30) Foreign Application Priority Data

Apr. 1, 2014 (KR) .......................... 10-2014-0038827
Apr. 1, 2014 (KR) .......................... 10-2014-0038828

(51) Int. Cl.
*H04N 5/232* (2006.01)
*G06F 3/01* (2006.01)

(52) U.S. Cl.
CPC ......... *H04N 5/23219* (2013.01); *G06F 3/017* (2013.01); *H04N 5/23293* (2013.01)

(58) Field of Classification Search
CPC ........... H04N 5/23216; H04N 5/23219; H04N 5/23293
See application file for complete search history.

(56) References Cited

U.S. PATENT DOCUMENTS

| | | | | |
|---|---|---|---|---|
| 5,594,469 A | * | 1/1997 | Freeman | G05B 19/106 345/157 |
| 6,025,827 A | * | 2/2000 | Bullock | H04N 5/232 348/E5.042 |

(Continued)

FOREIGN PATENT DOCUMENTS

| JP | 2002-252806 A | 9/2002 |
|---|---|---|
| JP | 2003-298682 A | 10/2003 |

(Continued)

*Primary Examiner* — Kevin L Young
*Assistant Examiner* — Parmanand D Patel
(74) *Attorney, Agent, or Firm* — Birch, Stewart, Kolasch & Birch, LLP

(57) ABSTRACT

A mobile terminal including a wireless communication unit configured to provide wireless communication; a camera; a touchscreen; a memory; and a controller configured to receive a first user gesture indicating a readiness for capturing an image through the camera, receive a second user gesture after receiving the first user gesture for indicating the camera to capture the image, and capture the image after a predetermined time period from receiving the second user gesture.

18 Claims, 30 Drawing Sheets

(56) References Cited

U.S. PATENT DOCUMENTS

| | | | |
|---|---|---|---|
| 2004/0085470 A1* | 5/2004 | Miyashita | H04N 5/23293 348/333.11 |
| 2005/0195308 A1 | 9/2005 | Miyashita | |
| 2005/0275638 A1* | 12/2005 | Kolmykov-Zotov | G06F 3/04883 345/179 |
| 2008/0074533 A1 | 3/2008 | Liao | |
| 2008/0231721 A1 | 9/2008 | Chou et al. | |
| 2010/0013943 A1 | 1/2010 | Thorn | |
| 2010/0026873 A1* | 2/2010 | Lee | H04N 5/272 348/333.05 |
| 2010/0053342 A1* | 3/2010 | Hwang | H04N 5/2259 348/207.99 |
| 2011/0102548 A1* | 5/2011 | Kim | H04N 13/221 348/46 |
| 2011/0134251 A1 | 6/2011 | Kim et al. | |
| 2011/0216075 A1 | 9/2011 | Shigeta et al. | |
| 2011/0221974 A1 | 9/2011 | Stern et al. | |
| 2012/0002899 A1* | 1/2012 | Orr, IV | G06T 5/50 382/282 |
| 2012/0058783 A1 | 3/2012 | Kim et al. | |
| 2012/0062453 A1 | 3/2012 | Oks et al. | |
| 2012/0162476 A1 | 6/2012 | Onoda | |
| 2012/0169670 A1 | 7/2012 | Kim et al. | |
| 2013/0027571 A1* | 1/2013 | Parulski | H04N 5/232 348/207.11 |
| 2013/0127712 A1 | 5/2013 | Matsubayashi | |
| 2013/0271618 A1* | 10/2013 | Koryakovskiy | H04N 5/232 348/211.5 |
| 2013/0329074 A1 | 12/2013 | Zhang et al. | |
| 2013/0329113 A1 | 12/2013 | Takatsuka et al. | |
| 2013/0335587 A1* | 12/2013 | Takatsuka | H04N 5/23219 348/211.4 |
| 2014/0043232 A1* | 2/2014 | Kurokawa | G06F 3/005 345/156 |
| 2014/0118600 A1* | 5/2014 | Son | H04N 5/23293 348/333.11 |
| 2014/0168470 A1* | 6/2014 | Yoshino | G06F 3/0488 348/231.7 |
| 2014/0300542 A1* | 10/2014 | Jakubiak | G06F 3/017 345/157 |
| 2016/0034039 A1* | 2/2016 | Maeda | G06F 3/011 715/810 |

FOREIGN PATENT DOCUMENTS

| | | |
|---|---|---|
| JP | 2005-286986 A | 10/2005 |
| JP | 2012-209728 A | 10/2012 |
| KR | 10-2011-0062484 A | 6/2011 |
| KR | 10-2012-0024247 A | 3/2012 |
| KR | 10-2012-0028248 A | 3/2012 |
| KR | 10-2012-0075714 A | 7/2012 |
| WO | WO 2012/011614 A1 | 1/2012 |

\* cited by examiner

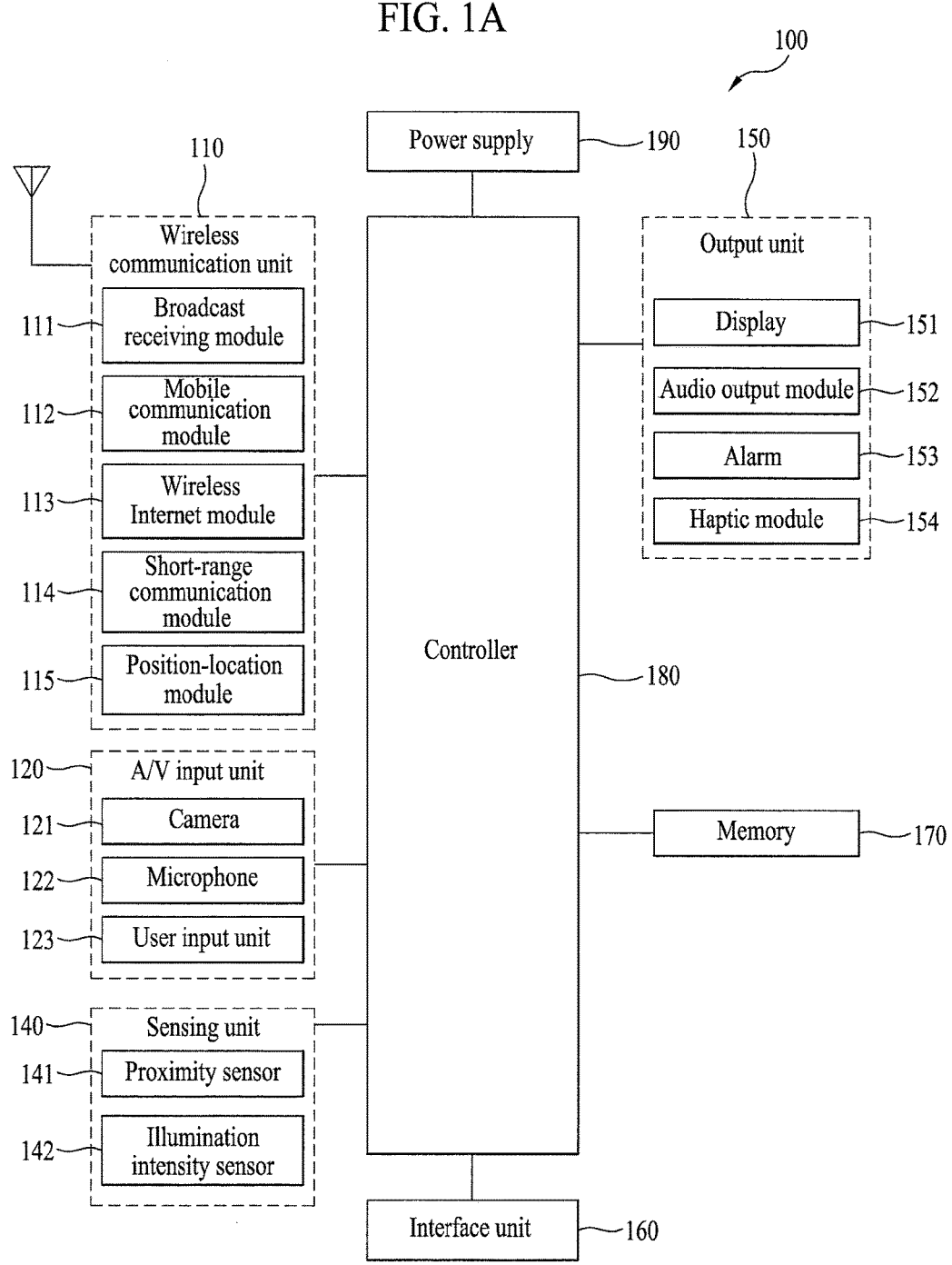

FIG. 4
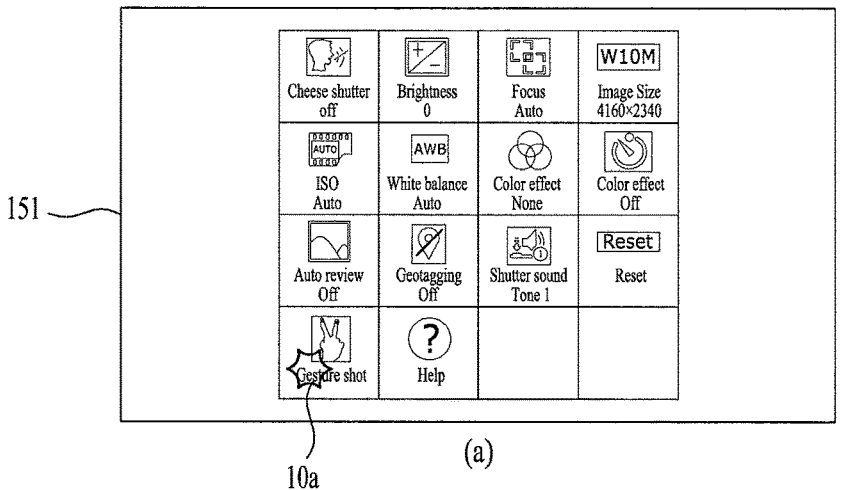
(a)
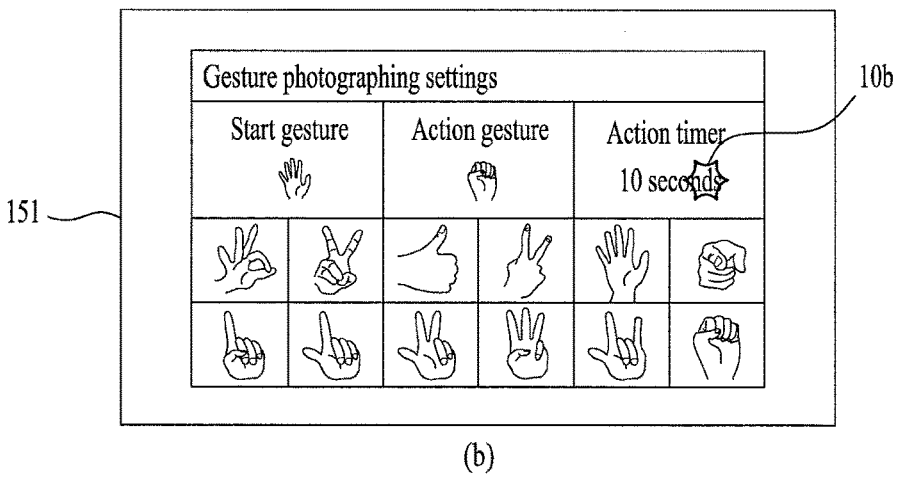
(b)
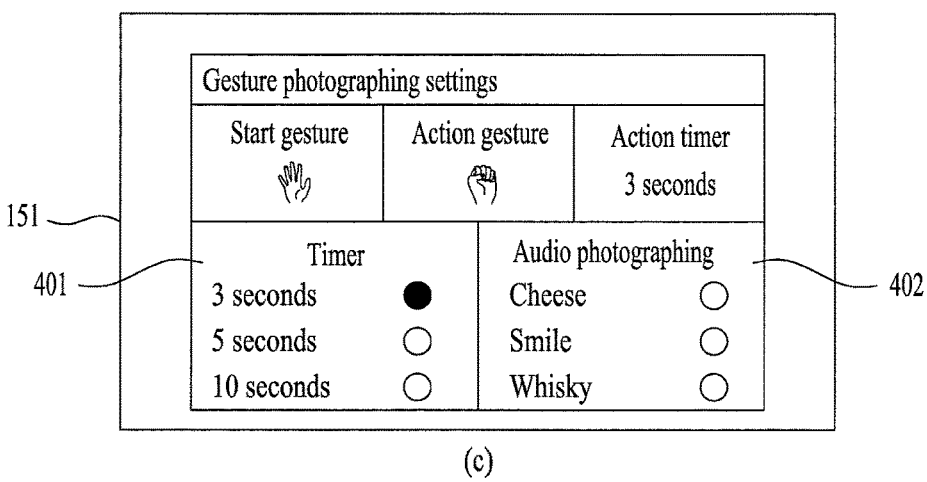
(c)

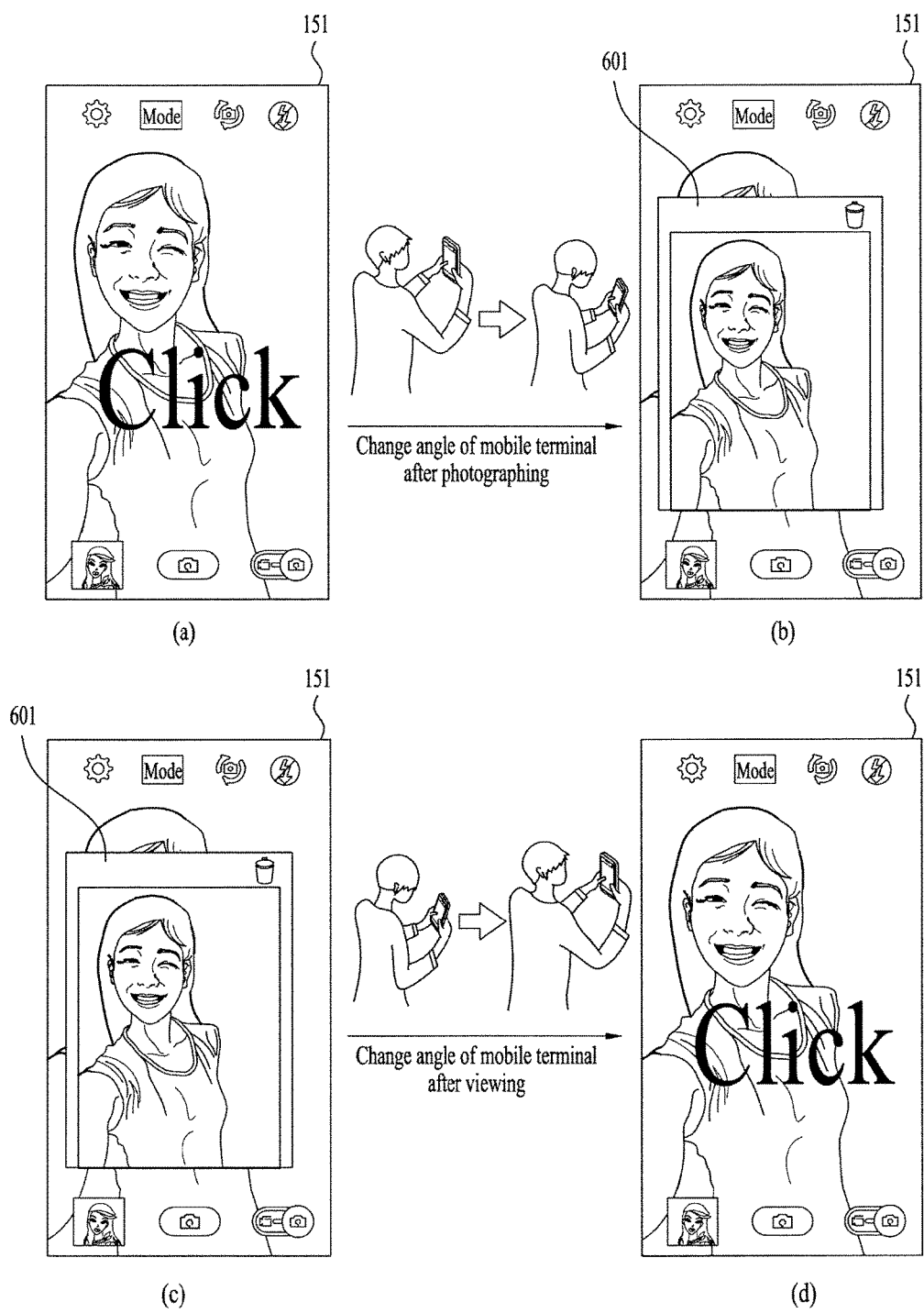

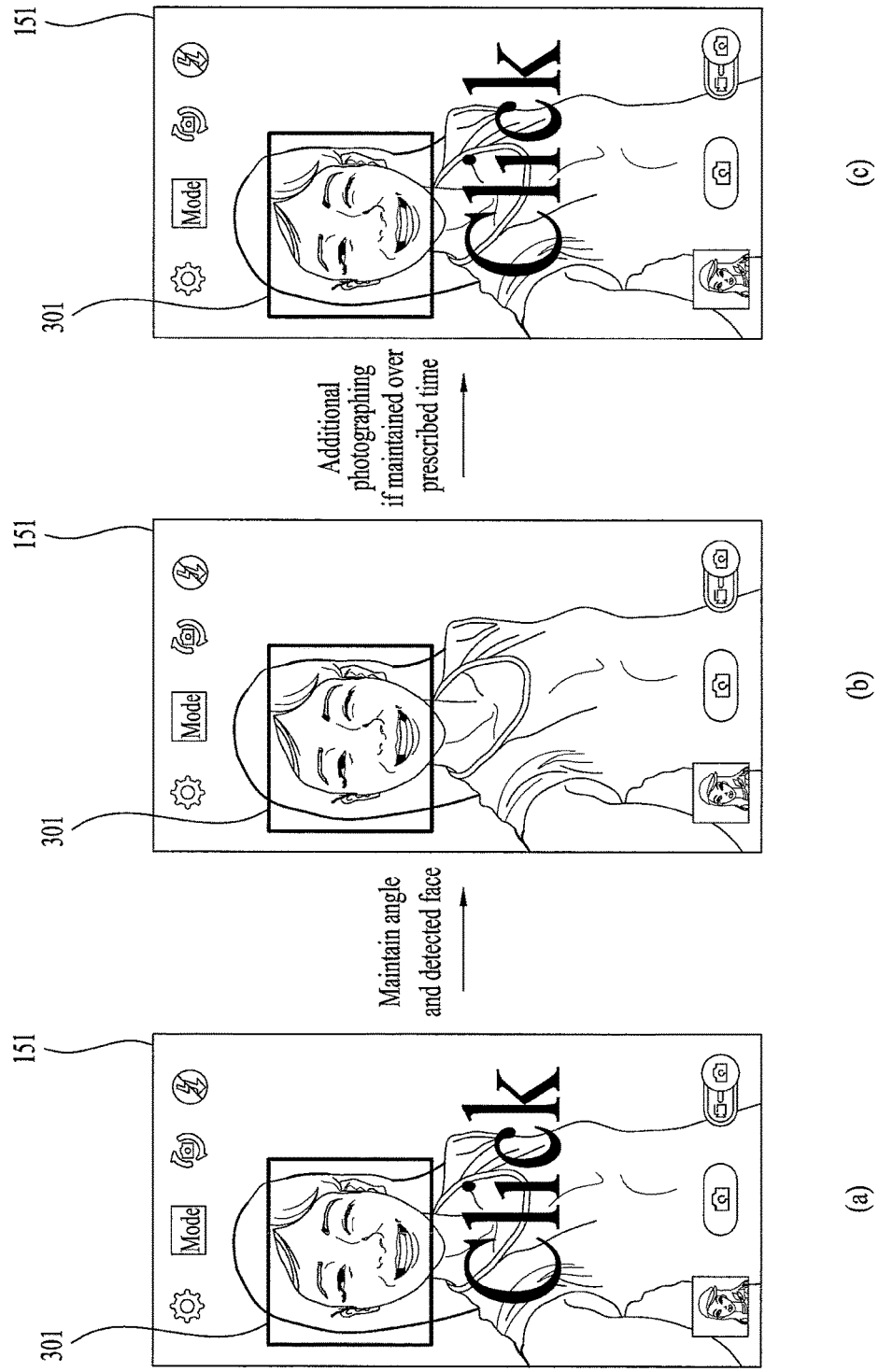

FIG. 9B
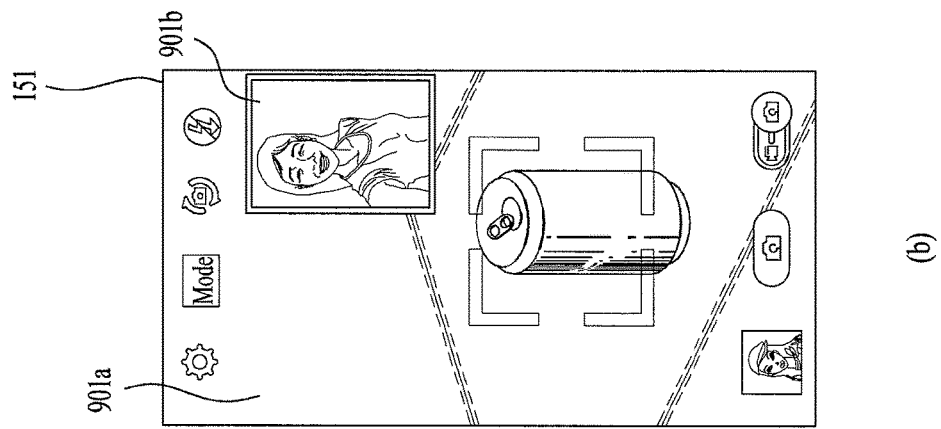

FIG. 15
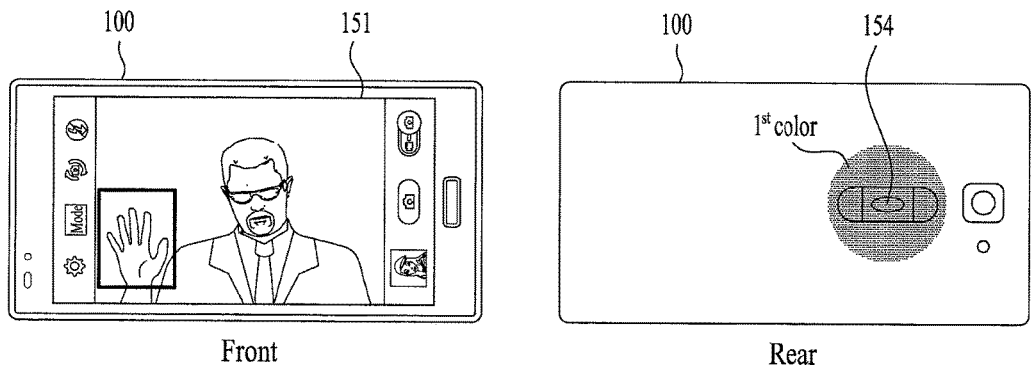
(a)
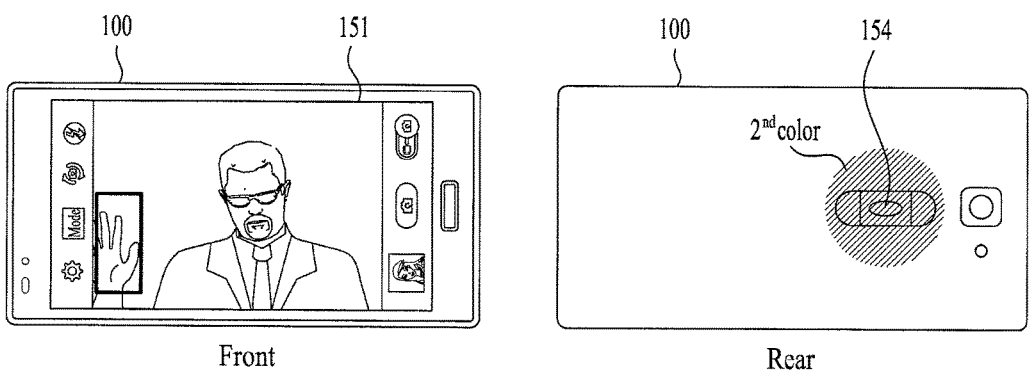
(b)
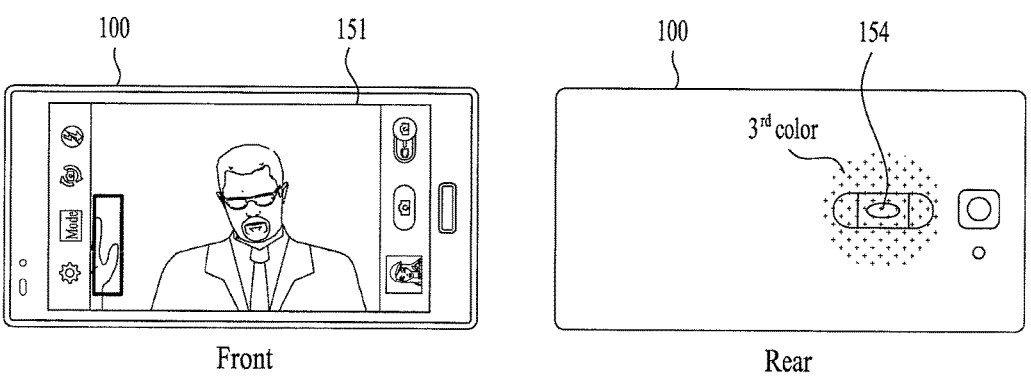
(c)

(a)　　　　　　　　　　　(b)

(a)          (b)

FIG. 23
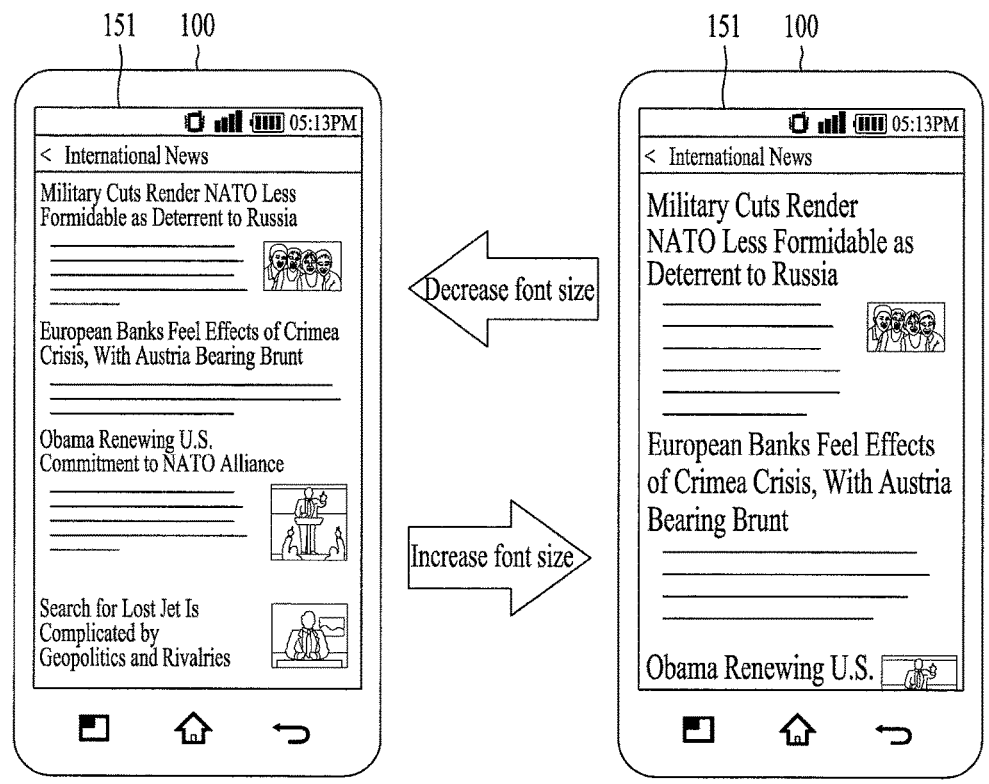
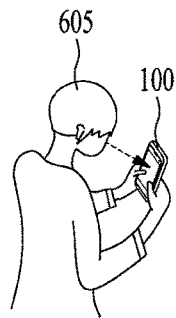
(a)
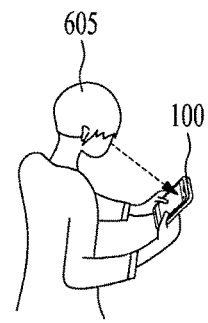
(b)

FIG. 24
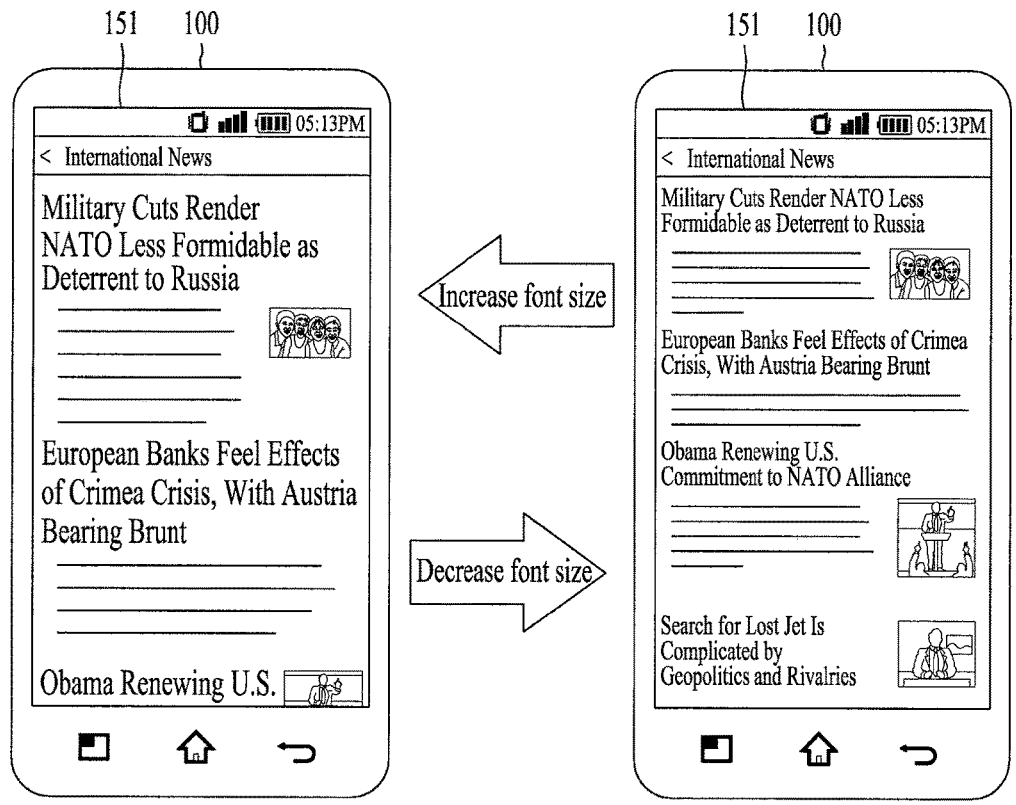
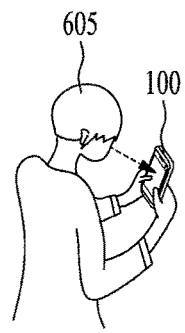
(a)
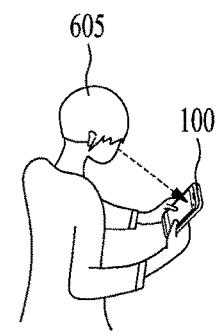
(b)

MOBILE TERMINAL AND METHOD THEREOF

This application claims the benefit of earlier filing date and right of priority to U.S. Provisional Application No. 61/939,225 filed on Feb. 12, 2014; Korean Application No. 10-2014-0038827 filed on Apr. 1, 2014 and Korean Application No. 10-2014-0038828 filed on Apr. 1, 2014, the contents of which are hereby incorporated by reference herein in their entirety.

BACKGROUND OF THE INVENTION

Field of the Invention

The present invention relates to a mobile terminal and corresponding method for controlling a camera on the mobile terminal using hand gestures.

Discussion of the Related Art

Generally, terminals can be classified into mobile/portable terminals and stationary terminals. The mobile terminals can be further classified into handheld terminals and vehicle mounted terminals. The terminal is also implemented as a multimedia player provided with composite functions such as photographing of photos or videos, playback of music or video files, game play, broadcast reception etc., for example.

Further, many users now use the camera included on their smart phone to take pictures and then share the pictures with other smartphone users. However, because the mobile terminal is small in size, it is often difficult to operate the menu options related to controlling the camera functions.

SUMMARY OF THE INVENTION

Accordingly, one object of the present invention is to provide a mobile terminal and method thereof that substantially obviate one or more problems due to limitations and disadvantages of the related art.

Another object of the present invention is to provide a mobile terminal and method thereof, by which a user's intention for photographing is accurately determined.

Still another object of the present invention is to provide a mobile terminal and method thereof, by which the mobile terminal can be controlled to fit a user's photographing intention.

To achieve these objects and other advantages and in accordance with the purpose of the invention, as embodied and broadly described herein, the present invention provides in one aspect a mobile terminal including a wireless communication unit configured to provide wireless communication; a camera; a touchscreen; a memory; and a controller configured to receive a first user gesture indicating a readiness for capturing an image through the camera, receive a second user gesture after receiving the first hand gesture for indicating the camera to capture the image, and capture the image after a predetermined time period from receiving the second user gesture.

In another aspect, the present invention provides a method of controlling a mobile terminal, and which includes receiving, via a controller of the mobile terminal, a first user gesture indicating a readiness for capturing an image through a camera of the mobile terminal; receiving, via the controller, a second user gesture after receiving the first user gesture for indicating the camera to capture the image; and capturing, via the camera, the image after a predetermined time period from receiving the second u gesture.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1A is a block diagram illustrating a mobile terminal according to one embodiment of the present invention;

FIGS. 4(a)-(c) are diagrams illustrating a control screen to set a start gesture and an action gesture according to one embodiment of the present invention;

FIGS. 7(a)-(c) are diagrams illustrating a method of performing an additional image photographing according to one embodiment of the present invention;

FIGS. 15(a)-(c) are diagrams illustrating a method of guiding a hand recognized state using an LED (light emitting device) according to one embodiment of the present invention;

FIGS. 23(a) and (b) are diagrams illustrating a method of increasing a font size in proportion to a distance between a mobile terminal and a user according to one embodiment of the present invention; and FIGS. 24(a) and (b) are diagrams illustrating a method of increasing a font size in inverse proportion to a distance between a mobile terminal and a user according to one embodiment of the present invention.

DETAILED DESCRIPTION OF THE INVENTION

Figure 1B:
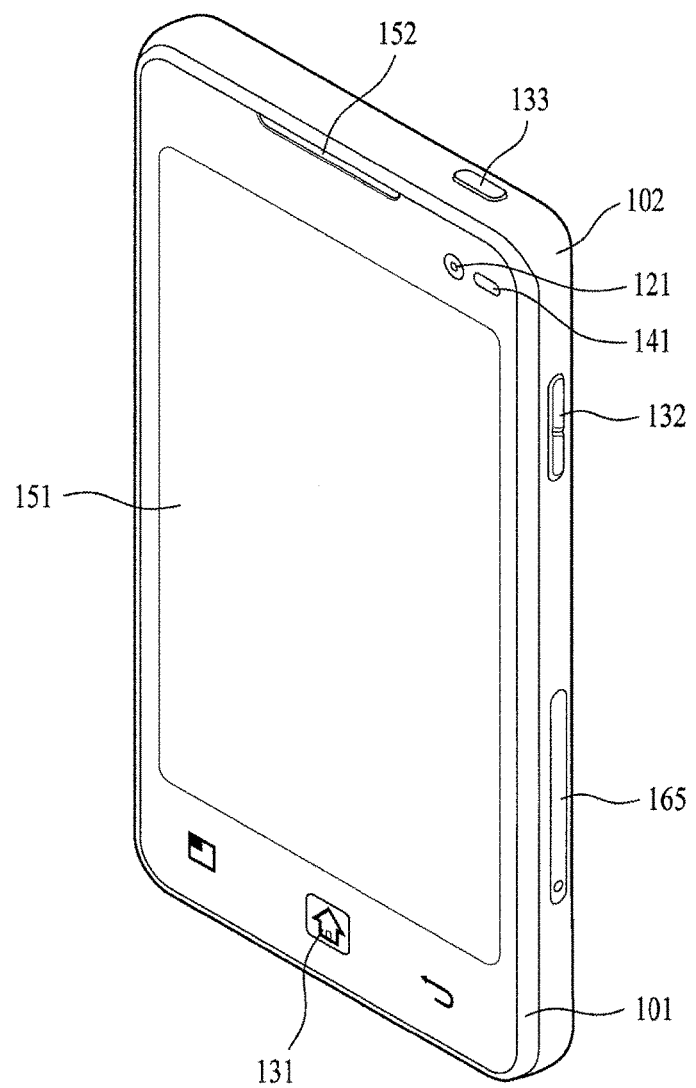
FIGS. 1B and 1C are front and rear perspective diagrams of a mobile terminal according to one embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the description only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipment, smart phones, digital broadcast receivers, personal digital assistants, laptop computers, portable multimedia players (PMP), navigators and the like. However, it is apparent to those skilled in the art that a configuration according to an embodiment disclosed in this specification is applicable to such a fixed terminal as a digital TV, a desktop computer and the like as well as a mobile terminal.

FIG. 1A is a block diagram of a mobile terminal 100 in accordance with an embodiment of the present invention. FIG. 1A shows the mobile terminal 100 includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1A shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. In a non-limiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-information module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1A, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 for a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button provided to front/rear/lateral side of the mobile terminal 100 and a touch sensor (constant pressure/electrostatic) and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and the touch sensor configures a mutual layer structure (hereinafter called 'touch screen'), the display 151 can be used as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor can be configured to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Referring to FIG. 1B, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm 153 is output a signal for announcing the occurrence of a particular event associated with the mobile terminal 100. Typical events include a call received event, a message received event and a touch input received event. The alarm 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

A projector module 155 can also be included for projecting images stored in the memory 160, externally received etc. The projector module 155 can also be rotated so as to project images in different directions.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output for a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input performed on the touchscreen as characters or images, respectively.

The power supply 190 provides power required by the various components for the mobile terminal 100. The power may be internal power, external power, or combinations thereof. A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 1B is a front perspective diagram of a mobile terminal according to one embodiment of the present invention. The mobile terminal 100 shown in the drawing has a bar type terminal body, however, the mobile terminal 100 may be implemented in a variety of different configurations. Examples of such configurations include folder-type, slide-type, rotational-type, swing-type and combinations thereof. For clarity, the following description will primarily relate to a bar-type mobile terminal 100. However such teachings apply equally to other types of mobile terminals.

Referring to FIG. 1B, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Electronic components can be mounted on a surface of the rear case 102. The electronic part mounted on the surface of the rear case 102 may include such a detachable part as a battery, a USIM card, a memory card and the like. Thus, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Figure 1C:
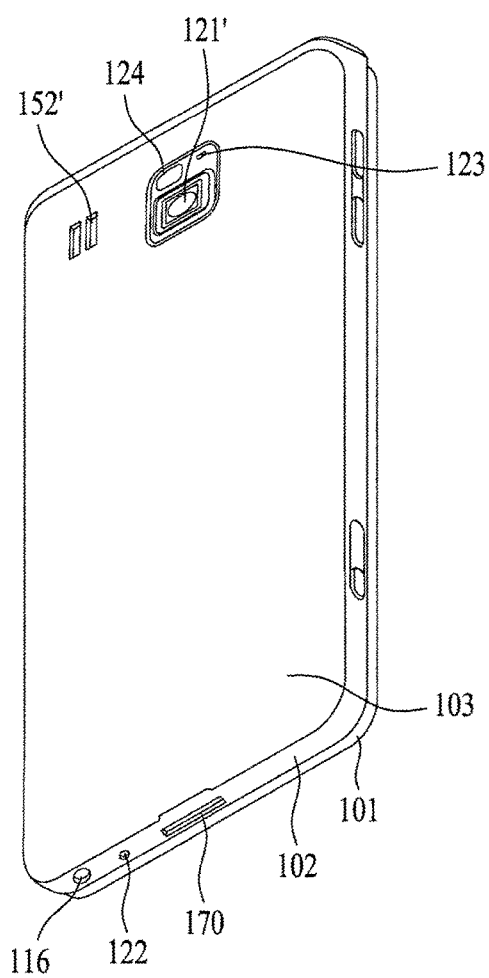

Referring to FIGS. 1B and 1C, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening configured to expose a camera 121' or an audio output unit 152' externally. The cases 101, 102 and 103 are formed by injection molding of synthetic resin or can be formed of metal substance such as stainless steel (STS), titanium (Ti) or the like for example.

A display 151, an audio output unit 152, a camera 121, user input units 130 (131, 132 and 133), a microphone 122, an interface 180 and the like can be provided to the case 101 or 102. The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131, 132 and 133. The manipulating units 131, 132 and 133 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the manipulating unit 133.

Figure 3:
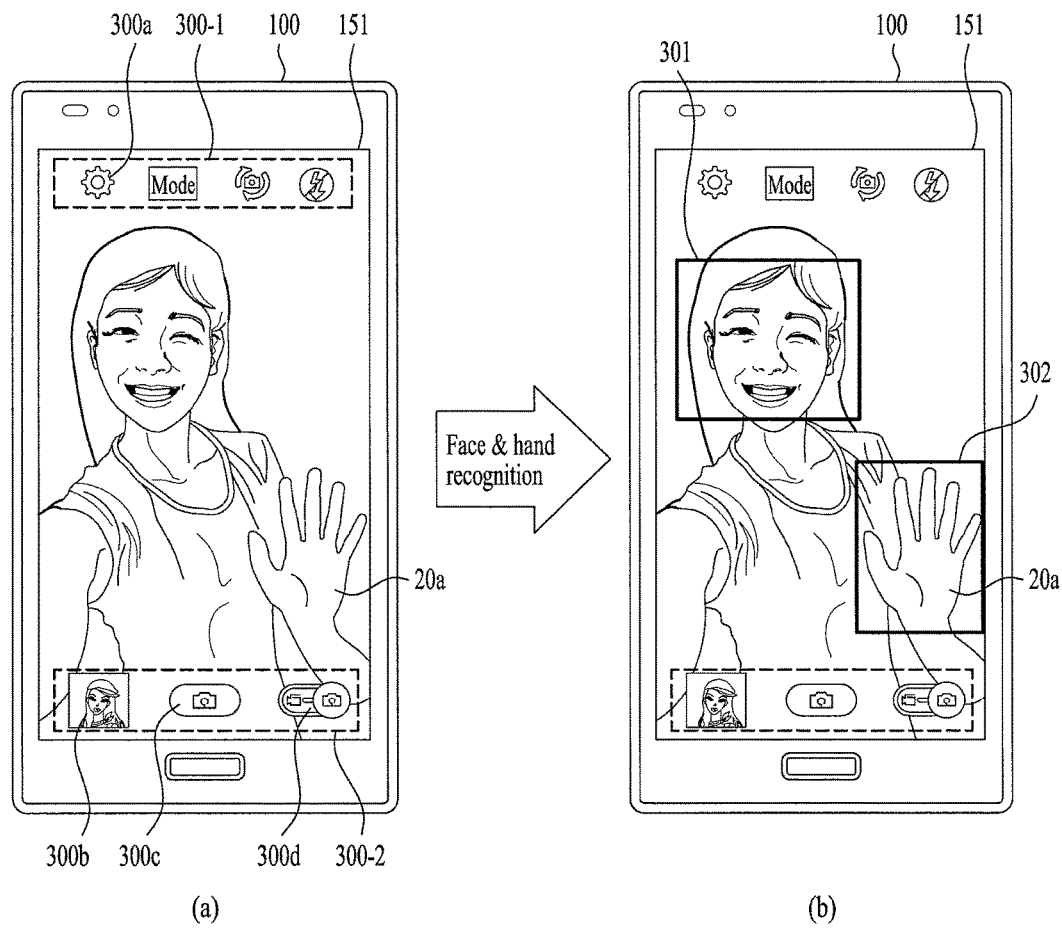
FIGS. 3(a) and 3(b) are diagrams illustrating a mobile terminal when recognizing a user's face and hand according to one embodiment of the present invention.

FIG. 1C is a perspective diagram of a backside of the terminal shown in FIG. 3. Referring to FIG. 3, a camera 121' can be additionally provided to a backside of the terminal body, and more particularly, to the rear case 102. The camera 121' has a photographing direction that is substantially opposite to that of the camera 121 shown in FIG. 1B and may have pixels differing from those of the camera 121.

Preferably, for instance, the camera 121 has low pixels enough to capture and transmit a picture of user's face for a video call, while the camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view their face reflected by the mirror 124.

An additional audio output unit 152' can be provided to the backside of the terminal body. The additional audio output unit 152' can implement a stereo function together with the former audio output unit 152 shown in FIG. 1B and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1A can be retractably provided to the terminal body.

According to one embodiment of the present invention, the mobile terminal 100 analyzes a user's gesture based on an image received from a camera and controls various kinds of photographing based on the analyzed user's gesture. In order to provide a user with a preview screen when a photographing operation is performed, images are consecutively received through the camera before the camera in clicked. Therefore, one embodiment of the present invention analyzes a user's gesture in images consecutively received before the photographing.

Figure 2A:
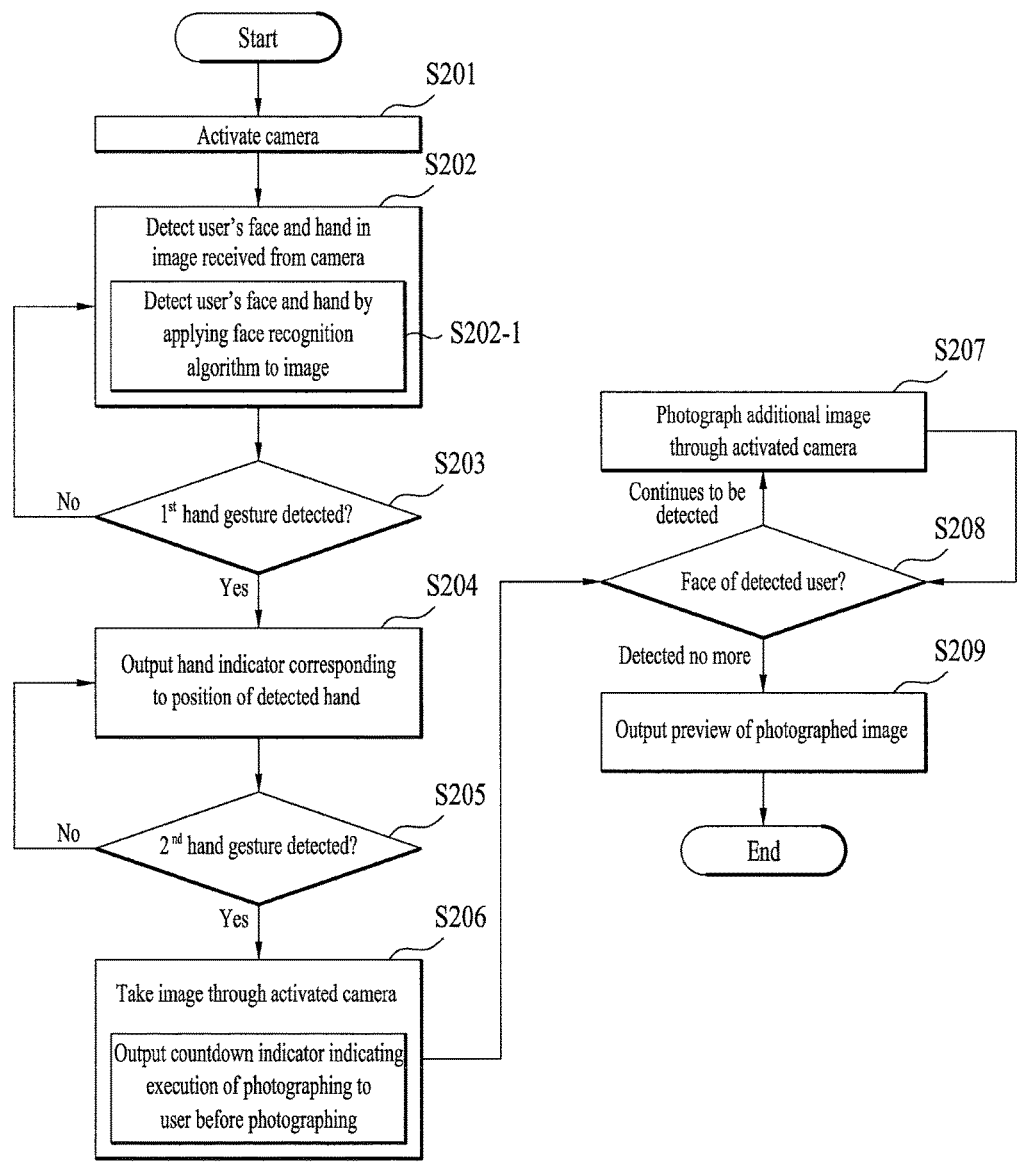
FIG. 2A is a flowchart illustrating a method of controlling a photographing operating by analyzing a user's gesture according to one embodiment of the present invention.
Figure 2B:
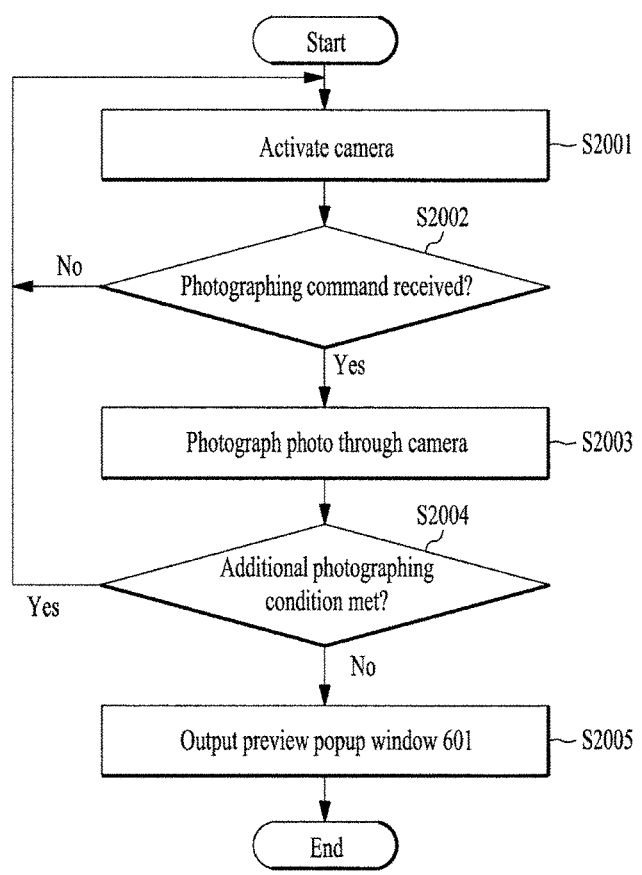
FIG. 2B is a flowchart illustrating a method of displaying a preview popup window automatically, if an additional photographing condition is not met, according to one embodiment of the present invention.

In more detail, FIG. 2A is a flowchart illustrating a method of controlling a photographing operation by analyzing a user's gesture according to one embodiment of the present invention, and FIG. 2B is a flowchart illustrating a method of displaying a preview popup window automatically, if an additional photographing condition is not met, according to one embodiment of the present invention.

Referring to FIG. 2A, the controller 180 enables the camera 121 (e.g., at least one of the first and second cameras 121 and 121') (S201). When the camera is enabled, and the user holds or maintains the camera at a same position, posture, angle, etc. for a prescribed duration, the controller 180 can automatically enable the camera. In particular, the controller 180 automatically enables the camera by determining a user's intention for photographing even though the user does not input an activation command additionally in order to enable the camera.

According to one embodiment of the present invention, in order to determine whether the camera is held over the prescribed duration, the mobile terminal 100 can use at least one of an acceleration sensor, a gyro sensor and a gravity sensor. When the user takes a photo using the mobile terminal 100, the user is spaced apart by a prescribed distance from the camera 121. Thus, the user's arm is stretched out. The controller 180 detects a change of acceleration of the mobile terminal 100 and/or a change of inclination of the mobile terminal through the above-enumerated sensor(s).

In addition, because a user generally takes a picture of his or her face at an angle in top-to-bottom view direction, the controller 180 can determine the user's photographing intention by analyzing a direction faced by the camera of the mobile terminal 100. In this instance, the corresponding direction may be detected through the gravity sensor.

The user's gesture can also be detected from the image received from the enabled camera 121. According to one embodiment of the present invention, the user's gesture includes a hand gesture. Moreover, according to one embodiment of the present invention, a user's face can be recognized and used to determine a movement of the mobile terminal 100, the user's photographing intention, etc. as well as a user's gesture.

FIGS. 3(a) and (b) are diagrams illustrating a mobile terminal when recognizing the user's face and hand according to one embodiment of the present invention. As shown, the controller 180 can display a face indicator 301 and a hand indicator 302 at a location of a recognized face and hand, respectively, while displaying a preview screen of an image activated through the camera.

In particular, FIG. 3(a) is a diagram illustrating a photographing configuration of the mobile terminal 100 in a photograph mode. In this instance, the photograph mode includes a photo mode for taking a still picture/burst shot and a video mode for shooting a video. The controller 180 displays a preview screen for a received image using the enabled camera. According to one embodiment of the present invention, the preview screen corresponds to a screen displayed to a user before a photographing operation. In particular, the controller 180 can display the preview screen in accordance with user's settings and/or default items.

Referring to FIG. 3(a), the controller 180 can display a setting button region 300-1 and a control button region 300-2 on the display 151. The setting button region 300-1 includes an environment/settings control button 300a for setting a photographing environment. The control button region 300-2 includes at least one of a quick view button 300b, a shutter button 300c and a photo/video mode switching button 300d.

In particular, the quick view button 300b is for viewing a recently taken photo. In response to an input of touching the quick view button 300b, the controller 180 displays a most recently taken photo. The shutter button 300c is a button for taking a photo in photo mode and starting/ending a video recording in video mode. In addition, the photo/video mode switching button 300d is for switching between a photo mode and a video mode.

Referring again to FIG. 2A, the controller 180 detects the user's hand and face included in the image received from the enabled camera (S202-1). Such a detection can be performed using a shape recognition algorithm (S202-1). In this instance, the shape recognition algorithm corresponds to an algorithm for discriminating shapes of a face and hand of a subject included in an image. In particular, the controller 180 detects a shape of a hand through the shape recognition algorithm and can then detect a hand gesture using the detected shape. Moreover, according to one embodiment of the present invention, at least one or more faces and hands (and corresponding gestures thereof) can be detected. A finger or fingers of a particular hand can also be detected.

The controller 180 then determines whether a first hand gesture is detected using the shape recognition algorithm (S203). If the first hand gesture is not detected (No in S203), the controller 180 can repeat the step S202. If the first hand gesture is detected (Yes in S203), the controller 180 proceeds to step S204. In this instance, the first hand gesture may include a start gesture that indicates an input of a hand gesture. In the following description, a start gesture and an action gesture are explained in detail.

First of all, according to one embodiment of the present invention, a hand gesture detected using a shape recognition algorithm is used as a user input mechanism. However, using only a hand gesture as the user input mechanism often results in an incorrect recognition. Hence, according to one embodiment of the present invention, the controller 180 uses two gestures including a start gesture and an action gesture.

In more detail, the start gesture is for indicating a timing point of using a hand gesture as an input mechanism. Thus, the controller 180 preferably does not enable any functions until detecting the start gesture. Once the start gesture is detected, the controller 180 can enable a prescribed function corresponding to an action gesture consecutively detected after detection of the start gesture. According to one embodiment of the present invention, a state for waiting for an additional detection of an action gesture in response to a detection of a start gesture is called a gesture enable mode.

In addition, in order to lower the number of incorrect recognitions, the controller 180 can enable a prescribed function only if detecting an action gesture within a prescribed time after the detection of a start gesture. For instance, when intending to enable a second function matching a second gesture, the user can enable the second function by inputting a start gesture and then inputting a second gesture consecutively. A method of setting a start gesture and an action gesture is described in more detail with reference to FIG. 4 as follows.

In addition, in the examples taken to describe embodiments of the present invention, the start gesture is assumed to include a gesture 20a (hereinafter named a palm gesture) performed by showing a palm by spreading out user's fingers (see FIG. 3(*a*)). In FIG. 3(*a*), the controller 180 detects a user's face and a palm gesture. Having detected the palm gesture corresponding to the start gesture, referring to FIG. 3(*b*), the controller 180 can display the face indicator 301 and the hand indicator 302 at a location of the analyzed user's face and the analyzed user's hand, respectively (S204).

As discussed above, a finger gesture can also be used. For example, the user could show an open finger as the start gesture and close the finger to indicate the action gesture. Thus, the user could show their finger in an open position and then in a closed position to instruct the camera to take a picture. A finger indicator could also be displayed on the display to instruct the help the user perform the start and action finger gestures. FIG. 4(*b*) also illustrates a first finger start gesture. The corresponding action gesture would then be the first finger closing.

Next, FIG. 4 is a diagram of a control screen to set a start gesture and an action gesture according to one embodiment of the present invention. In particular, FIG. 4(*a*) is a diagram illustrating a photographing setting screen. In response to a user's setting screen enter command (e.g., a touch input to the environment control button 300a), the controller 180 can display the photograph setting screen on the display 151.

According to one embodiment of the present invention, a photographing setting screen can include various kinds of setting buttons required for a photographing operation. For instance, the photographing setting screen can include a resolution setting button, a brightness setting button, a focus setting button, a gesture setting button and the like. Thus, when receiving an input 10a of selecting the gesture setting button, the controller 180 can display a gesture setting screen shown in FIG. 4(*b*).

A user can designate a hand gesture to use as a start gesture and an action gesture through the gesture setting screen. For instance, the user can designate the palm gesture as the start gesture through the gesture setting screen. In addition, the user can set an action corresponding to the action gesture. In this instance, the action means a function enabled by the controller 180 in response to the action gesture. Further, FIG. 4(*b*) illustrates a single finger (i.e., the first finger) being used as a start gesture. A corresponding action gesture could then be closing the first finger as discussed above.

If receiving a command 10b for setting an action as shown in FIG. 4(*b*), the controller 180 can output an action setting screen shown in FIG. 4(*c*). On the action setting screen, the user can set 'timer' and/or 'audio photographing' as a function which is to be enabled in response to an action gesture detection. In this instance, 'timer' means a setting of a time to initiate a photographing operation after expiration of prescribed seconds counted from a detection of an action gesture. In particular, if an action gesture is received, the controller 180 can take an image after expiration of a timer.

Further, audio photographing corresponds to a setting about what kind of audio announcement (e.g., "cheese") will be output after a detection of an action gesture. In particular, if an action gesture is received, the controller 180 can take an image after performing an output of the set audio data.

Figure 5:
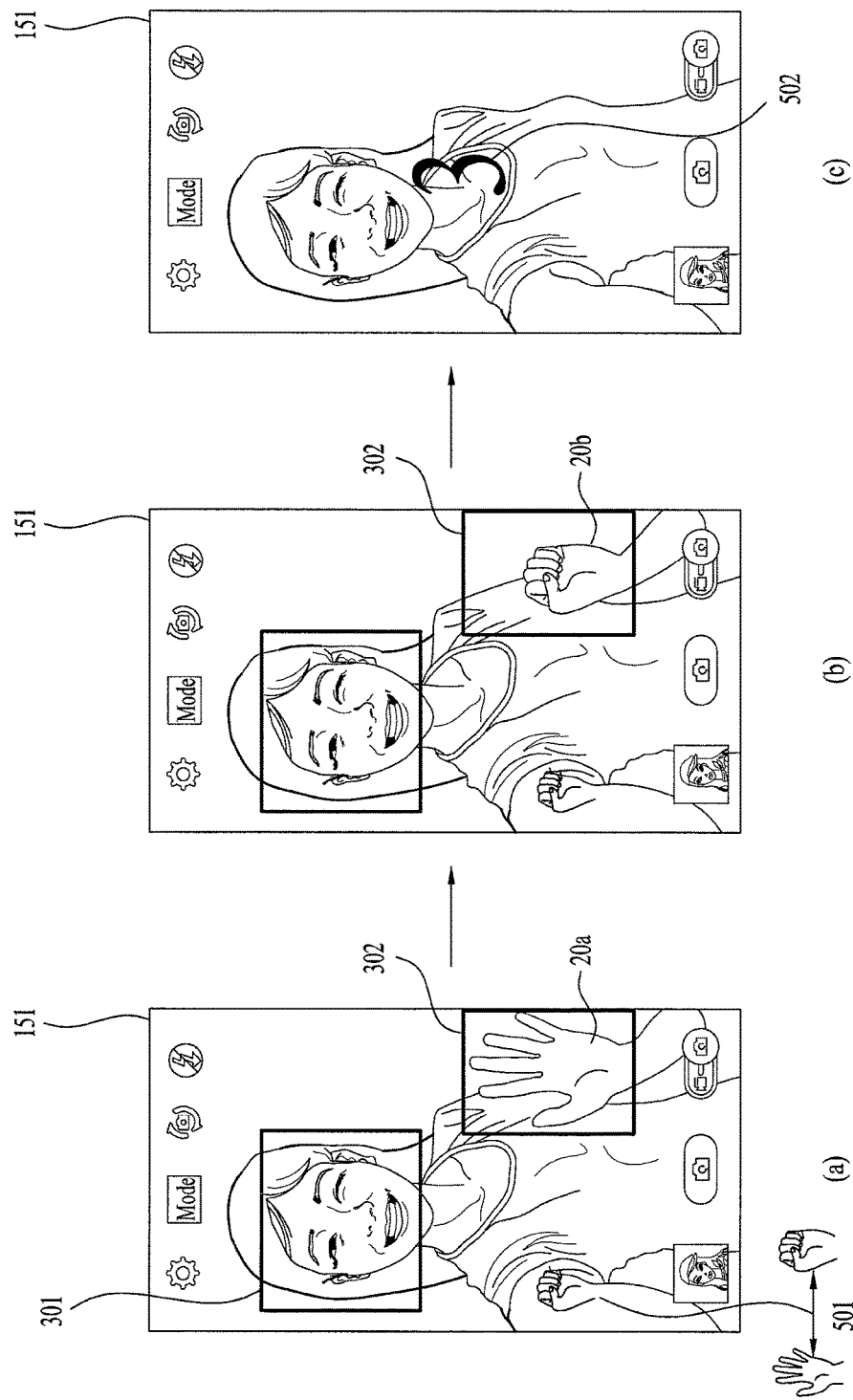
FIGS. 5(a)-(c) are diagrams illustrating a method of taking a photo in response to an action gesture according to one embodiment of the present invention.

Next, FIG. 5 is a diagram illustrating a method of taking a photo in response to an action gesture according to one embodiment of the present invention. In the examples illustrating embodiments of the present invention, an action gesture is assumed as a gesture 20b (hereinafter named a first gesture) in a clenched first shape.

Referring to FIG. 5(*a*), as mentioned in the foregoing description, the user's face and hand are recognized through a shape recognition algorithm. In particular, the controller 180 displays a hand indicator 302 in response to the recognition of a palm gesture 20a corresponding to a start gesture. Having received the palm gesture 20a corresponding to the start gesture, the controller 180 can further display an animation 501 to lead an input of an action gesture. In this instance, the animation 501 may include alternately displaying a design of the palm gesture 20a corresponding to the start gesture and a first gesture 20b corresponding to an action gesture.

The embodiment shown in FIG. 5 will now described in detail together with the flowchart shown in FIG. 2A. As shown, the controller 180 detects a second hand gesture (S205). In this instance, the second hand gesture may include an action gesture. In particular, once the action gesture is detected (Yes in S205), the controller 180 proceeds to step S206. If the action gesture is not detected (No in S205), the controller 180 can return to the step S204. Referring to FIG. 5(*b*), the controller 180 detects the first gesture 20b corresponding to the action gesture and then proceeds to step S206.

In the step S206, the controller 180 can take an image through an enabled camera. According to one embodiment of the present invention, a photographing operation is not performed immediately in response to a detection of an action gesture. That is, because a hand gesture input is generally performed through a camera, it is preferable that the hand gesture input is not included in a taken photo. Therefore, according to one embodiment of the present invention, a photo is taken after the expiration of a preset time after the detection of the action gesture.

In addition, the photo can be taken after a set audio data has been output. In the example shown in FIG. 5(c), the timer is set to 3 seconds. In particular, referring to FIG. 5(c), the set timer is activated in response to the detection of the first gesture 20b, and the photo is taken when the set timer expires.

Meanwhile, according to one embodiment of the present invention, if a prescribed condition is met, the controller 180 performs an additional photographing (S207 to S209). Such an embodiment will now be described in detail with reference to the steps S207 to S209 shown in FIG. 2A and FIGS. 6A to 7.

Figure 6B:
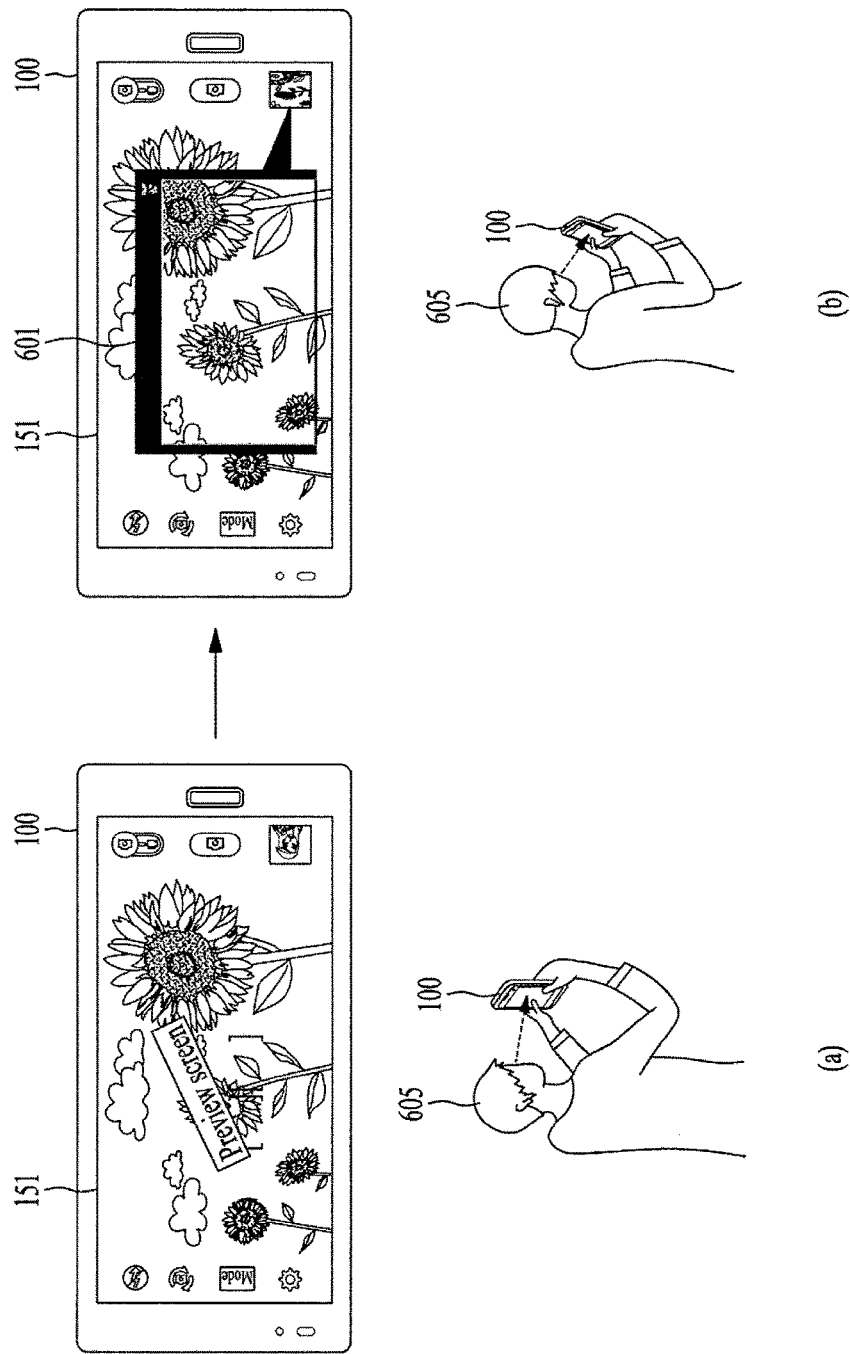
FIGS. 6A(a)-(d) and FIGS. 6B(a) and (b) are diagrams illustrating a method of displaying a preview screen of a photographed image according to one embodiment of the present invention.

FIGS. 6A and 6B are diagrams illustrating a method of outputting a preview screen of a photographed image according to one embodiment of the present invention. In addition, FIG. 7 is a diagram illustrating a method of performing an additional image photographing according to one embodiment of the present invention.

Referring to FIG. 6A(a), the controller 180 takes a photo in the step S206. After the photo has been taken, and if a prescribed condition is met, the controller 180 performs an additional photographing. If the prescribed condition is not met, referring to FIG. 6A(b), the controller 180 can display a preview popup window 601 of the taken photo. In this instance, the prescribed condition corresponds to a condition (hereinafter named an additional photographing condition) for determining a user's intention to continue the photographing operation.

According to one embodiment of the present invention, in order to check whether a user has an intention to continue a photographing operation, the controller 180 utilizes an angle of a mobile terminal and/or recognition of a presence or non-presence of the user's face. After a photo has been taken once, if a position or angle of a mobile terminal is not changed, the controller 180 determines the presence of the user's face as an intention of an additional photographing operation.

In particular, according to one embodiment of the present invention, the controller 180 detects whether an angle of the mobile terminal 100 detected through the gyro sensor is changed over a prescribed angle. If the angle is changed over the prescribed angle, the controller 180 can display the preview popup window 601 (detection of a variation of angle).

According to another embodiment of the present invention, if an angle of the mobile terminal 100 detected through the gyro sensor enters a prescribed angle range, the controller 180 can display the preview popup window 601. Generally, when a photo is taken, because the camera 121 of the mobile terminal 100 should face the subject or object, an angle of the camera 121 is fixed to a specific angle. However, after a photographing operation has finished, the user generally turns the touchscreen 151 at an angle suitable for viewing (detection of angle range).

According to a further embodiment of the present invention, if an acceleration variation (may be in specific direction) of the mobile terminal 100 detected through the acceleration sensor is equal to or greater than a prescribed numerical value, the controller 180 can display the preview popup window 601. That is because, when the user has intent to view a preview for just taken picture, the user might pull the mobile in front of the user.

According to another embodiment of the present invention, if a face recognized through the camera is not further recognized, the controller 180 determines that there is no photographing operation intention and can then display the preview popup window 601. In particular, if a face included in an initial photographing operation is not further recognized through the camera, this can be regarded as a non-presence of an additional photographing operation intention.

In addition, referring to FIG. 6A(a) and (b), the controller 180 can sense a first position of the mobile terminal 100 when receiving the first and second hand gestures, and display a preview image of the captured image when the mobile terminal 100 is moved to a second position different than the first position. The first position can be the mobile terminal 100 raised by the user to take the picture and the second position can be the mobile terminal lowered so the user can view the popup preview window 601 as shown in FIG. 6A(a) and (b). Further, as shown in FIG. 6A(c) and (d), the controller 180 can also capture another image when the mobile terminal 100 is moved back to the first position from the second position without having to receive the first and second gestures.

Meanwhile, according to the embodiment described with reference to FIG. 6A, a photographing operation is performed through the first camera 121a provided to a front side of a body of the mobile terminal 100, by which the present invention is non-limited. For instance, the same principle of the embodiment described with reference to FIG. 6A can be equally applied to performing a photographing operation through the second camera 121b provided to a backside of the body of the mobile terminal 100. This case is described with reference to FIG. 6B as follows.

FIG. 6B(a) illustrates the user 605 gripping the mobile terminal 100 for taking a picture using the second camera 121b. As shown, when a scenery photo is taken, the user 601 generally stretches their arm(s) such that the second camera 121b faces the desired direction. After a photo has been taken, if the user 605 has no intention for an additional photographing operation, the second camera 121b does not need to face a specific direction. Hence, the user 605 moves the mobile terminal 100 toward the user's body and may view the display 151 in a comfortable posture (FIG. 6B(b)). If such a posture is detected, referring to FIG. 6B(b), the controller 180 can automatically display a preview popup window 601 of the taken photo.

Referring again to FIG. 2A, if the face recognized in the step S202 keeps being detected (Yes in S208), the controller 180 proceeds to step S207. Otherwise (No in S208), the controller 180 determines that there is no additional photographing operation intention and can then display a preview screen (e.g., preview popup window 601) of the taken image.

Meanwhile, a user sees a preview of a photographed image and may be then able to re-photograph a corresponding image. In this situation, the present invention further proposes an embodiment of a controlling method for facilitating a return to a previous photographing mode. Such an embodiment is described in detail with reference to FIG. 6C as follows.

Figure 6C:
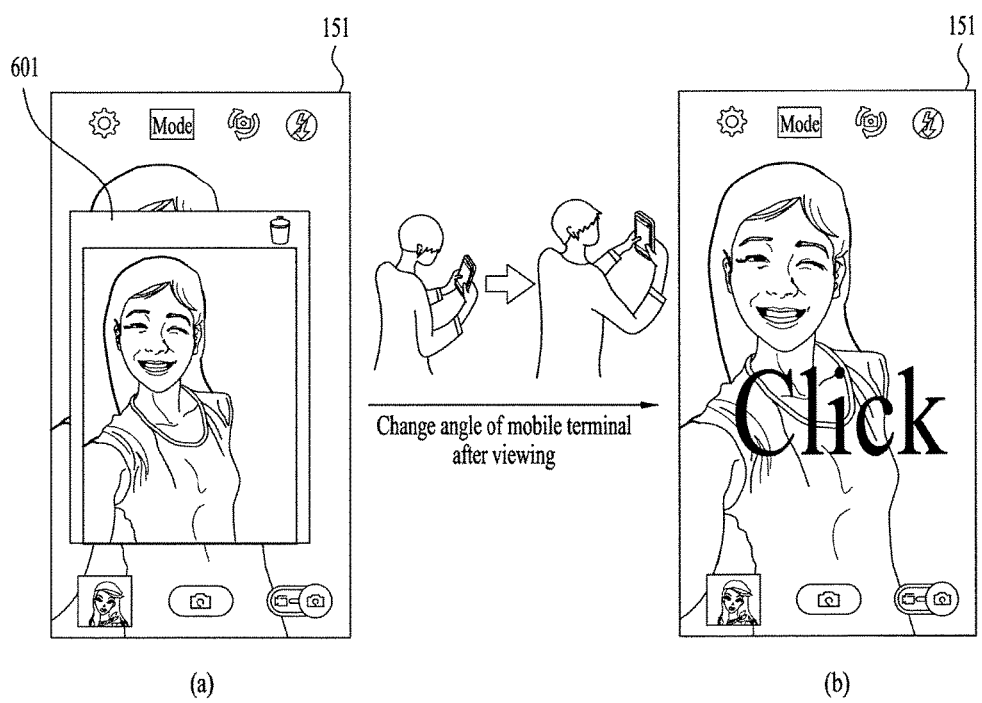

FIG. 6C is a diagram to describe a controlling method for returning to a photographing mode in the course of outputting a preview screen of a photographed image.

The determination of an intention of re-photographing can be made based on whether a prescribed condition (hereinafter named a photographing mode return condition) is met. In particular, the controller 180 determines whether the photographing mode return condition is met. If the photographing mode return condition is met, the controller 180 stops outputting the preview screen of the photographed image and is then able to return to a previous photographing mode.

Referring to FIG. 6C (a), a preview popup window 601 outputted in a step S209 is displayed through the touchscreen 151.

In the example shown in FIG. 6, the photographing mode return condition corresponds to a case as follows. First of all, after an arm holding the mobile terminal 100 has been stretched, the start gesture (e.g., a palm gesture 20a) is detected [FIG. 6C (a)]. The detection of the action of stretching the aim holding the mobile terminal 100 can be determined based on a result sensed through an acceleration sensor and/or a gyro sensor. In particular, if a motion corresponding to at least one of an acceleration in a prescribed direction over a prescribed acceleration, a distance over a prescribed distance, and an angle over a prescribed angle is detected, the controller 180 can determine that the arm holding the mobile terminal 100 is stretched. In summary of the example shown in FIG. 6C, while a preview of a photographed image is being outputted, if a photographing mode return condition is met, the controller 180 returns to a previous photographing mode and is then able to output a preview screen of an image received from an activated camera [FIG. 6C (b)].

If the photographing mode return condition is not met, the controller 180 can keep outputting the preview screen of the photographed image [FIG. 6C (a)].

In the step S207, the controller 180 can take an additional photo. In particular, referring to FIG. 7(a), the controller 180 takes a photo in the step S206. After performing the photographing operation once, if the angle and the detected face keeps being detected (FIG. 7(b)), the controller 180 can perform an additional photographing operation (FIG. 7 (c)).

Moreover, according to one embodiment of the present invention, a photo is automatically taken based on a result of a face recognition not only when the above-mentioned additional photographing operation but also for an initial photographing operation. As the result of the face recognition, if it is determined that a prescribed face keeps being detected from an image received through the camera, the controller 180 can take a photo automatically.

According to one embodiment of the present invention, because a photographing operation is controlled by detecting a gesture, the user may not need control buttons displayed on the touchscreen. Hence, according to an embodiment of the present invention, the control buttons are removed/not displayed in response to a prescribed gesture input. Such an embodiment will be described in detail later with reference to FIG. 8.

Meanwhile, according to the above-described embodiment, the method of displaying the preview popup window 601 depending on whether the additional photographing operation condition is met after taking the photo by the start and action gestures is described, by which the present invention is non-limited. For instance, when a photo is taken by a general user command, the controller 180 can display the preview popup window 601 automatically. This case is described with reference to the flowchart shown in FIG. 2B as follows.

As shown, the controller 180 enables the camera 121 (S2001) (e.g., first and second cameras included and denoted by a reference number 121 in the following specification). The controller 180 then determines whether a photographing operation command is received from a user (S2002). If the photographing operation command is received (Yes in S2002), the controller 180 proceeds to step S2003. Otherwise (No in S2002), the controller 180 returns to step S2001. An example of the photographing operation command includes touching the shutter button 300c.

In step S2003, the controller 180 takes a photo through the camera 121. In step S204, the controller 180 determines whether an additional photographing operation condition is met. In this instance, the additional photographing operation condition is similar to the former description with reference to FIGS. 6A and 6B. In step S2005, the controller 180 determines that there is no user's intention for the additional photographing operation, and automatically displays the preview popup window 601 so that a result of the taken photo can be provided to the user.

Figure 8:
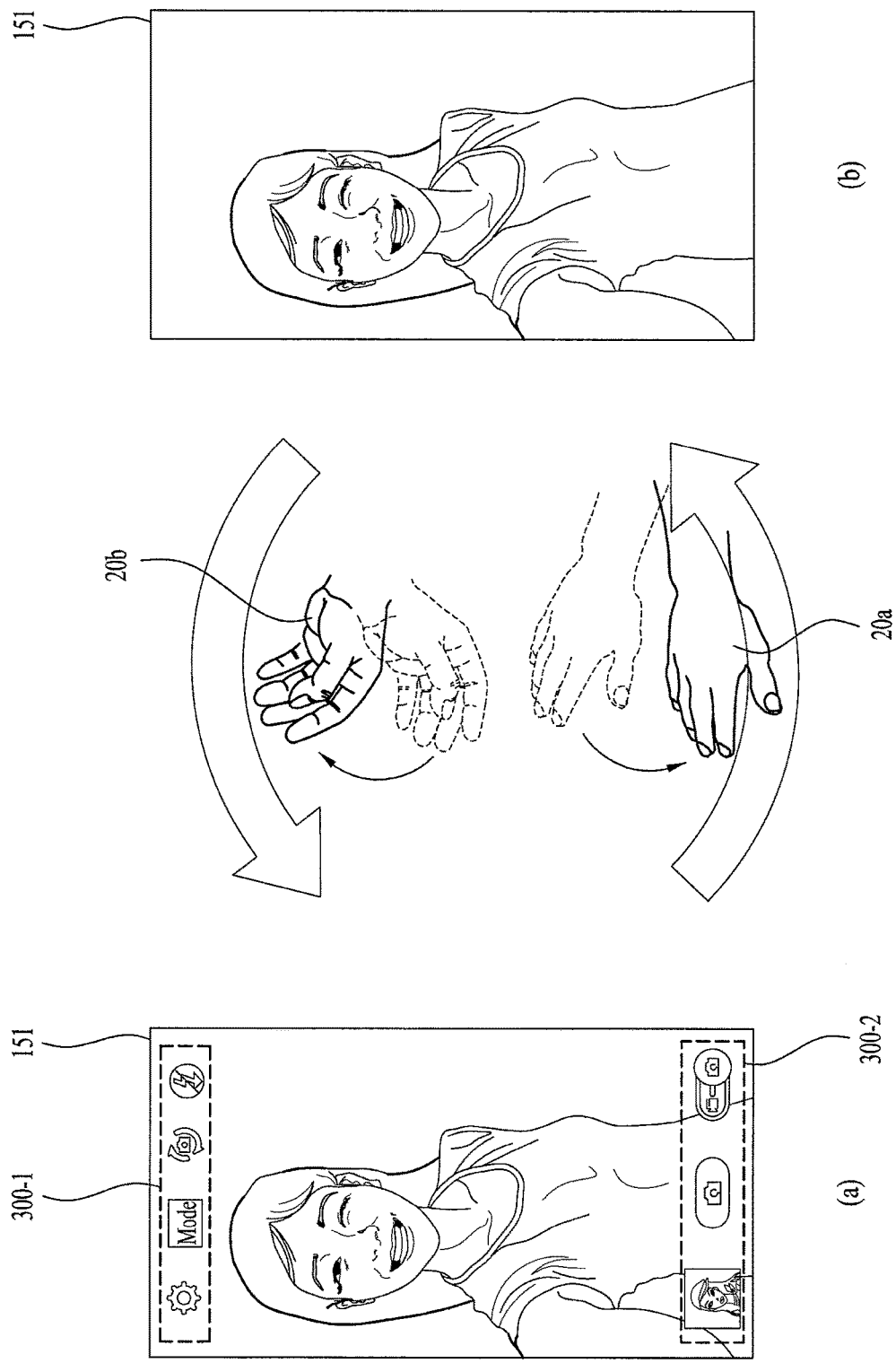
FIGS. 8(a) and (b) are diagrams illustrating a method of displaying/removing a setting button region and a control button region according to one embodiment of the present invention.

Next, FIG. 8 is a diagram illustrating a method of displaying/removing a setting button region 300-1 and a control button region 300-2 according to one embodiment of the present invention. Referring to FIG. 8(a), the mobile terminal 100 is in a photographing operation mode, and a photographing operation configuration diagram is currently displayed through the touchscreen 151. As mentioned in the foregoing description with reference to FIG. 3, the controller 180 can display a setting button region 300-1 and a control button region 300-2 in the photographing operation configuration diagram.

According to one embodiment of the present invention described with reference to FIG. 8, after a start gesture (e.g., a palm gesture 20a) has been detected, in response to an action gesture (hereinafter named a button remove gesture) for removing a button, the controller 180 stops displaying various control buttons displayed on a camera preview screen.

In FIG. 8, the palm gesture 20a corresponding to the start gesture has been detected already. If a button removal gesture is received in FIG. 8(a), the controller 180 can control the buttons, which are output to the setting button region 300-1 and the control button region 300-2, to be removed. According to one embodiment of the present invention, the button removal gesture may include the gesture 20a performed by sweeping the palm downwards (switch to (b) from (a)).

Further, in FIG. 8(b), if a button display gesture corresponding to an action gesture for displaying buttons is received, the controller 180 can display buttons of the setting button region 300-1 and the control button region 300-2. According to one embodiment of the present invention, the button display gesture may include the gesture 20b performed by sweeping the palm upwards (switch to (a) from (b)).

According to the above-described embodiment, the mobile terminal 100 has a length direction of the touchscreen 151 set to a portrait direction. Yet, the same principle of the corresponding embodiment may be equally applied to the mobile terminal 100 having a length direction of the touchscreen 151 set to a landscape direction. In this instance, the gesture 20a/20b performed by sweeping the palm down/up in the bottom/top direction is applicable by changing the bottom/top direction into a right/left direction. For instance, in response to a gesture performed by sweeping the palm down in the left direction, control buttons can be displayed. In another instance, in response to a gesture performed by sweeping the palm down in the right direction, control buttons can be hidden.

According to one embodiment of the present invention, the control buttons can automatically stop being displayed after a photo has been taken by a detection of a gesture. If the control buttons are not needed, the control buttons are not be displayed on a preview image. In particular, if a photographing operation configuration screen can be controlled by a gesture detection, the control buttons are not needed. Hence, the corresponding output is stopped.

For instance, as mentioned in the foregoing description of the embodiment with reference to FIG. 5, after a photo has been taken in response to the sequential detections of the palm gesture 20a and the first gesture 20b, the controller 180 can stop displaying the control buttons in the setting button region 300-1 and the control button region 300-2.

According to one embodiment of the present invention, a gesture for switching a plurality of cameras 121 of the mobile terminal 100 is provided. Such an embodiment is described in detail with reference to FIG. 9A and FIG. 9B as follows.

Figure 9A:
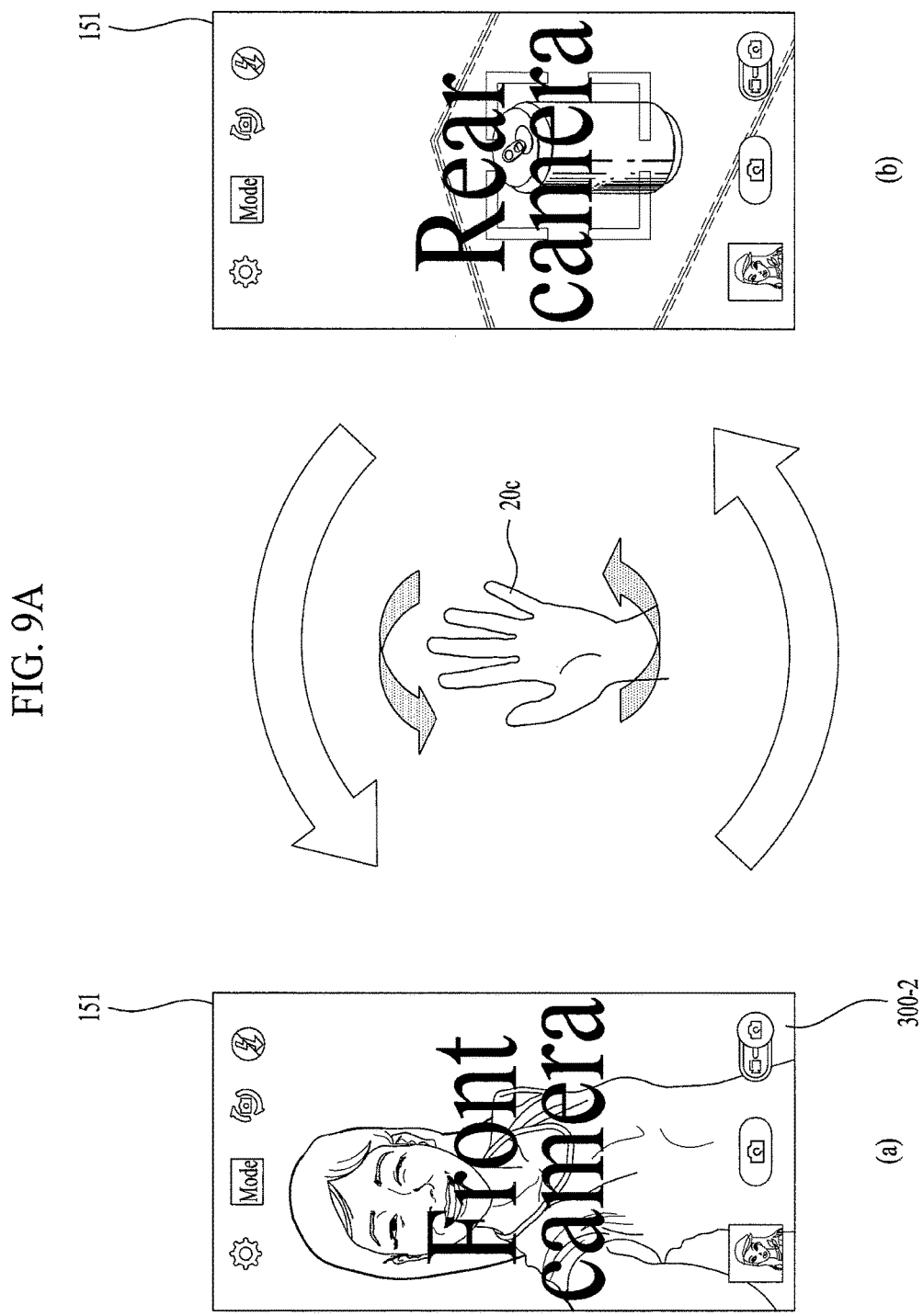
FIGS. 9A(a) and (b) and FIGS. 9B(a) and (b) are diagrams illustrating a gesture for switching a plurality of cameras.

Next, FIGS. 9A and 9B are diagrams of a gesture for switching a plurality of cameras. Referring to FIG. 9A(a), the mobile terminal 100 is in a photographing operation mode and currently displays a preview screen of an image received from the front camera 121a (i.e., the first camera shown in FIG. 1B).

According to one embodiment of the present invention described with reference to FIGS. 9A and 9B, in response to an action gesture 20c (hereinafter named a camera switch gesture) after a start gesture (e.g., a palm gesture 20a) has been detected, the controller 180 performs a switching between the front camera 121a and the rear camera 121b (e.g., the second camera shown in FIG. 1C). In FIGS. 9A and 9B, the palm gesture 20a corresponding to the start gesture has been detected already.

Once the camera switch gesture is detected, the controller 180 can perform the switching between the front camera 121a and the rear camera 121b. In particular, while a preview screen is displayed through the front camera 121a (FIG. 9A(a)), if the camera switch gesture 20c is detected, the controller 180 can display a preview screen of an image received from the rear camera 121b and vice versa. One example of the camera switch gesture 20c corresponds to turning over a palm.

Meanwhile, in a dual photographing operation mode of taking a photo by enabling two cameras, the controller 180 can switch preview screen regions in response to a camera switch gesture. In particular, FIG. 9B is a diagram illustrating one example of a dual photographing operation mode.

Referring to FIG. 9B, a preview screen of an image received from the front camera 121a is currently displayed to a first region 901a (i.e., a main preview region) and a preview screen of an image received from the rear camera 121b is currently displayed to a second region 901b (i.e., an auxiliary preview region). If a camera switch gesture 20c is detected, the controller 180 can switch the preview screens by displaying the preview screen of the image received from the front camera 121a to the second region 901b and also displaying the preview screen of the image received from the rear camera 121b to the first region 901a.

According to the above-mentioned embodiment, the controller 180 performs a photographing operation once in response to a detection of an action gesture. According to another embodiment of the present invention, the controller 180 performs photographing operations as many as the count designated by a user. Particularly, the controller 180 designates the count using a hand gesture as well.

Figure 10:
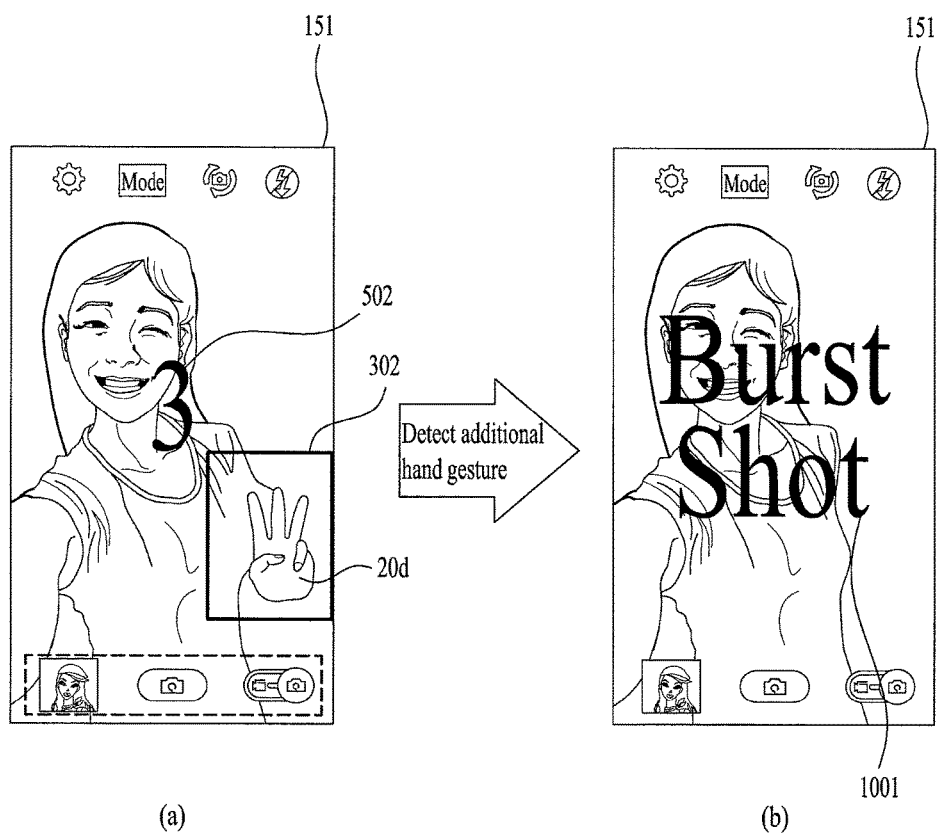
FIGS. 10(a) and (b) are diagrams illustrating a method of designating a photographing count in response to a detection of an additional hand gesture according to one embodiment of the present invention.

In particular, FIG. 10 is a diagram illustrating a method of designating a photographing operation count in response to a detection of an additional hand gesture according to one embodiment of the present invention. Referring to FIG. 10(a), the controller 180 activates a timer in response to a detection of an action gesture 20d. If an addition gesture (i.e., a third hand gesture) is detected after a detection of a start gesture (i.e., a first hand gesture) and a detection of the action gesture (i.e., a second hand gesture) in order, the controller 180 can adjust the photographing operation count as many as a count corresponding to the additional gesture.

In this instance, the additional gesture may include a gesture performed by stretching out fingers amounting to the additional photographing operation count. In the example shown in FIG. 10(a), the controller 180 detects the additional gesture 20d performed by stretching out three fingers. Referring to FIG. 10(b), the controller 180 performs a burst shot for photographing three photos consecutively.

The aforementioned control button region 300-2 includes the photo/video mode switch button 300d configured to switch a photo mode and a video mode. According to one embodiment of the present invention, if a gesture at a specific position is detected, the controller 180 switches between the photo and video modes. Such an embodiment will now be described in detail with reference to FIGS. 11 and 12.

Figure 11:
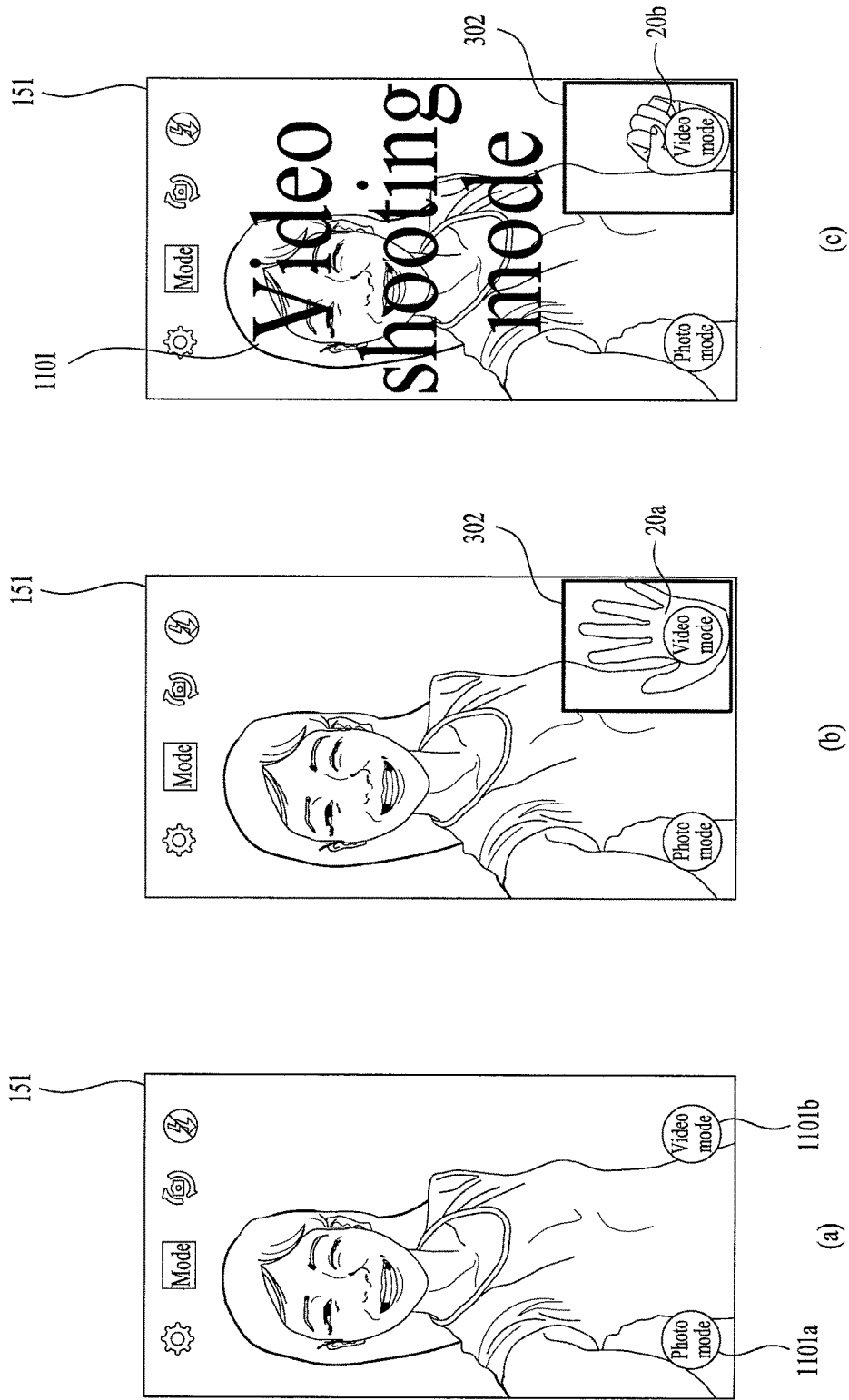
FIGS. 11(a)-(c) and FIGS. 12(a)-(c) are diagrams illustrating a gesture for switching between a photo mode and a video mode according to one embodiment of the present invention.
Figure 12:
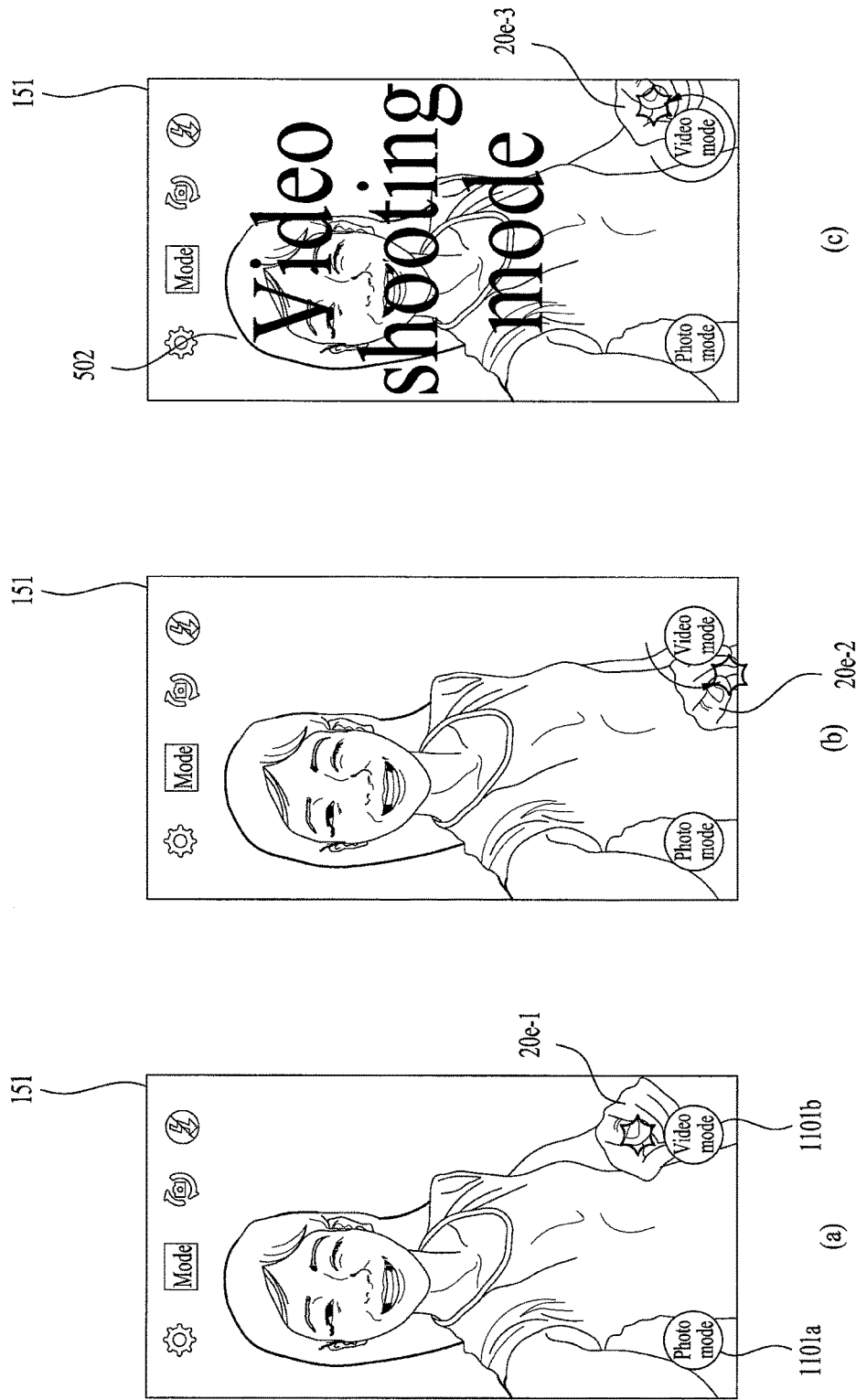

In particular, FIGS. 11 and 12 are diagrams illustrating a gesture for a switching between a photo mode and a video mode according to one embodiment of the present invention. Referring to FIG. 11(a), the mobile terminal 100 displays a photographing operation configuration diagram. In this instance, the photographing operation configuration diagram includes a photo mode button 1101a for switching to a photo mode and a video mode button 1101b for switching to a video mode.

If a prescribed hand gesture is detected over the photo mode button 1101a or the video mode button 1101b, the controller 180 can switch a current mode to the corresponding mode. Like the example shown in FIGS. 11(b) and (c), if a prescribed gesture is input to a position of the video mode button 1101b on a preview image, the controller 180 can switch a current mode to the video mode. In this instance, the prescribed gesture may include sequentially inputting a palm gesture 20a corresponding to a start gesture and a first gesture 20b corresponding to an action gesture to the position of the video mode button 1101b on the preview image.

Meanwhile, according to the embodiment described with reference to FIG. 11, the first gesture 20b corresponding to the same action gesture of the former embodiment is taken as an example. However, since the above gestures may be performed over a mode button, the embodiment described with reference to FIG. 11 can be used by being combined with the former embodiments described with reference to FIGS. 5 to 10.

For instance, if the start gesture 20a and the action gesture 20b are not performed over the mode button, the photographing operation is performed like FIG. 5. In another instance, if the start gesture 20a and the action gesture 20b are performed over the mode button, a current mode can be switched to the corresponding mode. Further, referring to FIG. 12, the prescribed gesture may include a gesture 20e-1 to 20e-3 performed by drawing a circle at a position of the video mode button 1101b on the preview screen using a finger.

In addition, according to one embodiment of the present invention, the controller 180 can designate a start point of a shooting and an end point of the shooting in a video shooting mode using gestures. Such an embodiment is described in detail with reference to FIG. 13 as follows.

Figure 13:
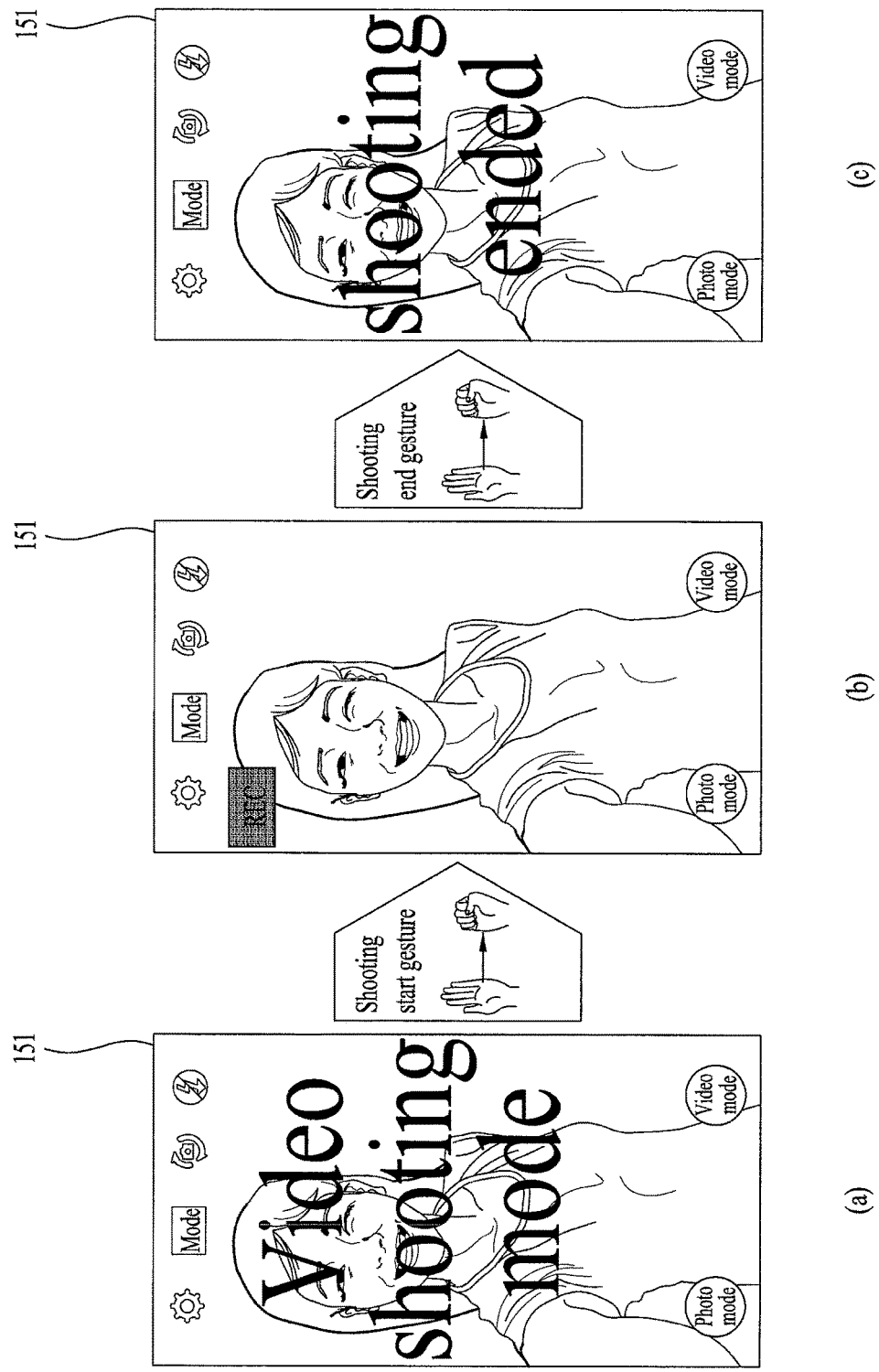
FIGS. 13(a)-(c) are diagrams illustrating a prescribed gesture for designating a start/end point in shooting a video according to one embodiment of the present invention.

FIG. 13 is a diagram illustrating a prescribed gesture for designating a start/end point in shooting a video according to one embodiment of the present invention. Referring to FIG. 13(a), the controller 180 displays a shooting configuration diagram in a video mode. Once a shooting start gesture is input, the controller 180 can start to shoot a video (FIG. 13(b)).

In this instance, the shooting start gesture may include a first gesture 20b like an action gesture in a photographing operation. Yet, it is preferable to input a palm gesture 20a corresponding to a start gesture before the action gesture is input. In particular, if a user inputs the palm gesture 20a and the first gesture 20b in order, the user can start to shoot a video. If an end gesture is input while shooting the video, referring to FIG. 13(c), the controller 180 stops shooting the video and can then save the taken video. In this instance, the shooting end gesture may include the first gesture 20b as well.

Meanwhile, according to one embodiment of the present invention, the first gesture 20b saved while shooting the video is automatically deleted from the saved video. That is, the user generally does not want the hand gesture included in the stored video. In particular, if the shooting end gesture is detected, the controller 180 only saves the video, which has been shot until a prescribed time ahead of a detection of the video, and deletes the rest of the video.

Meanwhile, according to the above-described embodiment, a single character or person included in an image is taken as an example. However, embodiments of the present invention apply to a plurality of characters or people included in an image. A corresponding embodiment will now be described in detail with reference to FIG. 14.

Figure 14:
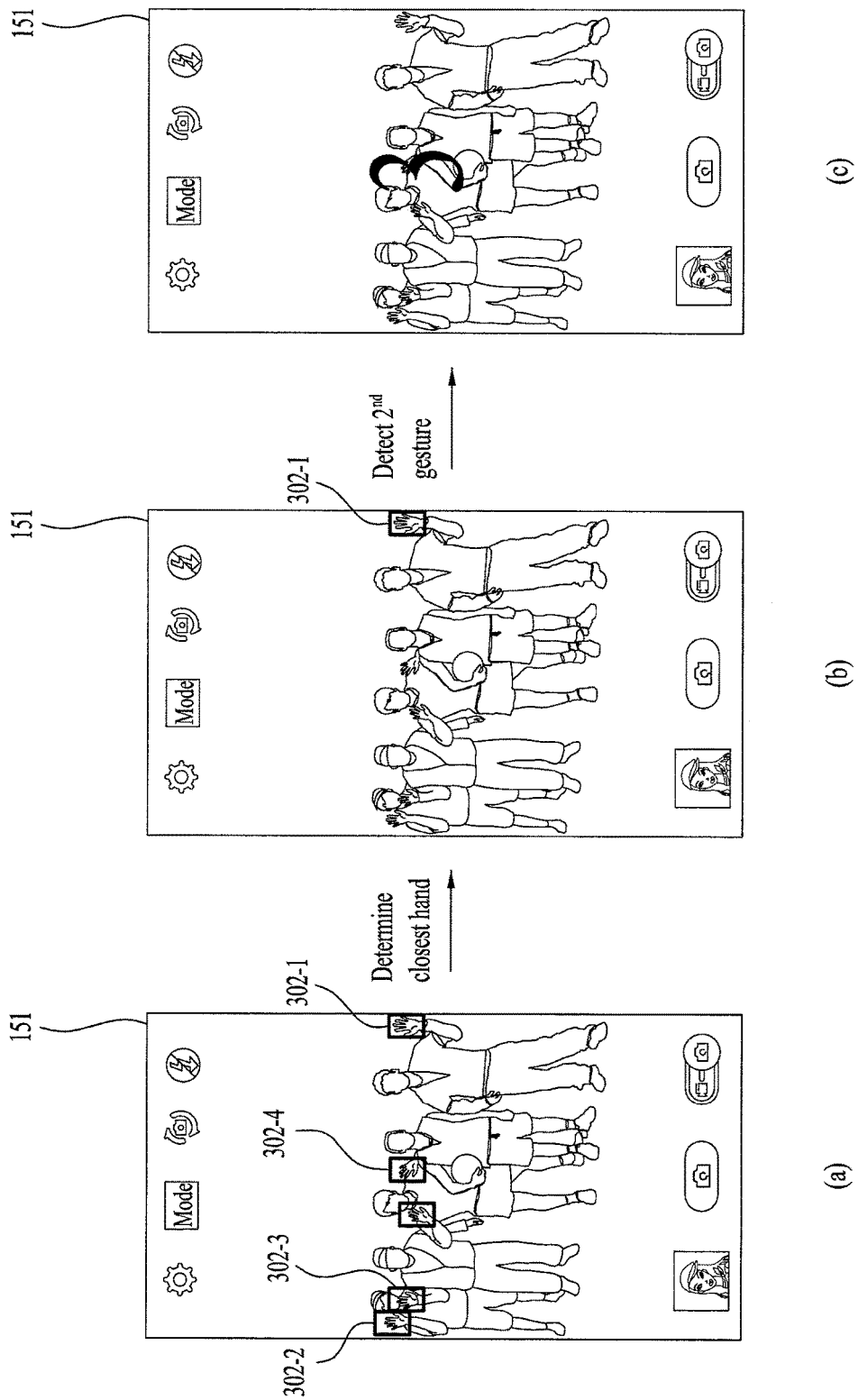
FIGS. 14(a)-(c) are diagrams illustrating a method of recognizing a hand gesture for a plurality of users according to one embodiment of the present invention.

In particular, FIG. 14 is a diagram illustrating a method of recognizing a hand gesture, when a plurality of users are included, according to one embodiment of the present invention. Referring to FIG. 14(a), the controller 180 displays a photographing operation configuration diagram and a preview screen for an image received from a camera. In particular, a plurality of characters are included in the preview screen. In addition, the controller 180 can recognize hands of the people. Moreover, the controller 180 can output a plurality of hand indicators 302-1 to 302-4 for the recognized hands.

According to one embodiment of the present invention, as mentioned in the above description, when a plurality of hands are recognized, the controller 180 selects one of the hands and controls the mobile terminal 100 using a gesture recognized through the selected hand. In particular, according to one embodiment of the present invention, a hand closest to the mobile terminal 100 is selected from a plurality of the recognized hands and an operation can be then performed based on a hand gesture with the selected hand.

The determination of the closest hand can be made using a size of a recognized hand or a separate sensor configured to sense a distance. However, the method of detecting a distance of a recognized hand is non-limited. Once the closest hand is determined, referring to FIG. 14(b), the controller 180 can display only the hand indicator 302-1, which indicates the closest hand.

In particular, the controller 180 can stop displaying the hand indicators 302-2 to 302-4 for the other hands. If a start gesture and an action gesture with the selected hand are detected, referring to FIG. 14(c), the controller 180 can perform a photographing operation.

In addition, according to one embodiment of the present invention, a method of indicating a recognized state of a hand using a light emitting device is proposed. In particular, FIG. 15 is a diagram illustrating a method of guiding a hand recognized state using an LED (light emitting device) according to one embodiment of the present invention. In this embodiment, a light output unit 156 is provided to a rear side of the mobile terminal 100.

FIG. 15(a) illustrates a hand is accurately recognized using a shape recognition algorithm, FIG. 15(b) illustrates a hand is insufficiently recognized, and FIG. 15(c) illustrates failing in recognition. In order to indicate the above-mentioned recognized state, the controller 180 controls the light output unit 154 to output a first color in an accurately recognized state, to output a second color in an insufficiently recognized state, and to output a third color in a recognition failure state. In particular, a user can determine whether their hand is correctly recognized through a color change of the light output unit 154 provided to the rear side of the mobile terminal 100.

According to one embodiment of the present invention, a method of performing a photographed image using the aforementioned hand gesture will now be described with reference to FIGS. 16 and 17. In particular, FIGS. 16 and 17 and are diagrams illustrating a method of managing a plurality of photographed images using a hand gesture according to one embodiment of the present invention.

Referring to FIG. 16(a), the controller 180 displays a photographing operation configuration diagram of burst shot photos. The photographing operation configuration diagram may further include a progressive bar 1600 indicating a rate of currently shot photos over total shot photos.

Once the photographing operation is completed, referring to FIG. 16(b), the controller 180 can display a thumbnail region 1601, which includes thumbnails of a plurality of the photographed photos. In this instance, each of the thumbnails of the photos included in the thumbnail region 1601 may include a checkbox 1602 that can be checked by a user. In addition, the check box 1602 can be switched between check and release each time it is touched by a user.

According to one embodiment of the present invention, the controller 180 automatically unchecks an unfocused image among a plurality of photographed images (or photos). In particular, because a user generally doesn't want to keep the unfocused image, one embodiment of the present invention automatically unchecks the unfocused image to facilitate the deletion of the unfocused image.

While the thumbnail region 1601 is displayed, if a user's image delete gesture is detected, the controller 180 deletes an image corresponding to an unchecked photo thumbnail and can save an image corresponding to a checked photo thumbnail only. In the example shown in FIG. 16, the image delete gesture may include a gesture performed by sequentially performing a first gesture 20b corresponding to a start gesture and a palm gesture 20a corresponding to an action gesture. Meanwhile, according to one embodiment of the present invention, the controller 180 can display the thumbnail region 1601 on a full screen of the touchscreen 151.

Referring to FIG. 17(a), the controller 180 displays a photographing operation configuration diagram of photographing operation burst shot photos. According to one embodiment of the present invention, if the burst shooting is completed, the controller 180 can directly display the thumbnail region 1601.

According to another embodiment of the present invention, although the burst shooting is completed, the thumbnail region 1601 is not directly displayed. Like the example shown in FIG. 17(a), the controller 180 can display the thumbnail region 1601 if a command for displaying a preview region is received from a user.

Figure 16:
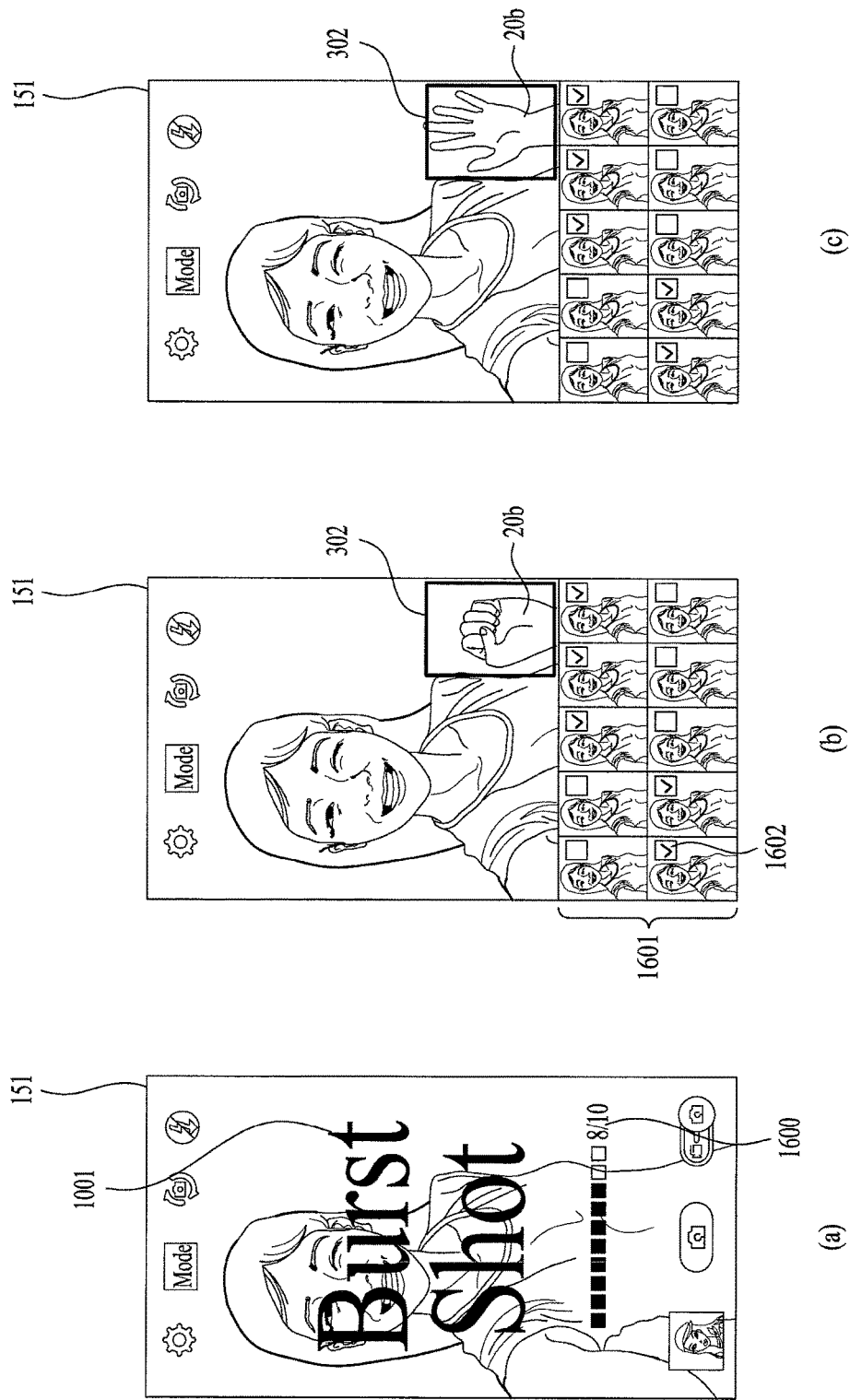
FIGS. 16(a)-(c) and FIGS. 17(a) and (b) are diagrams illustrating a method of managing a plurality of photographed images using a hand gesture according to one embodiment of the present invention.
Figure 17:
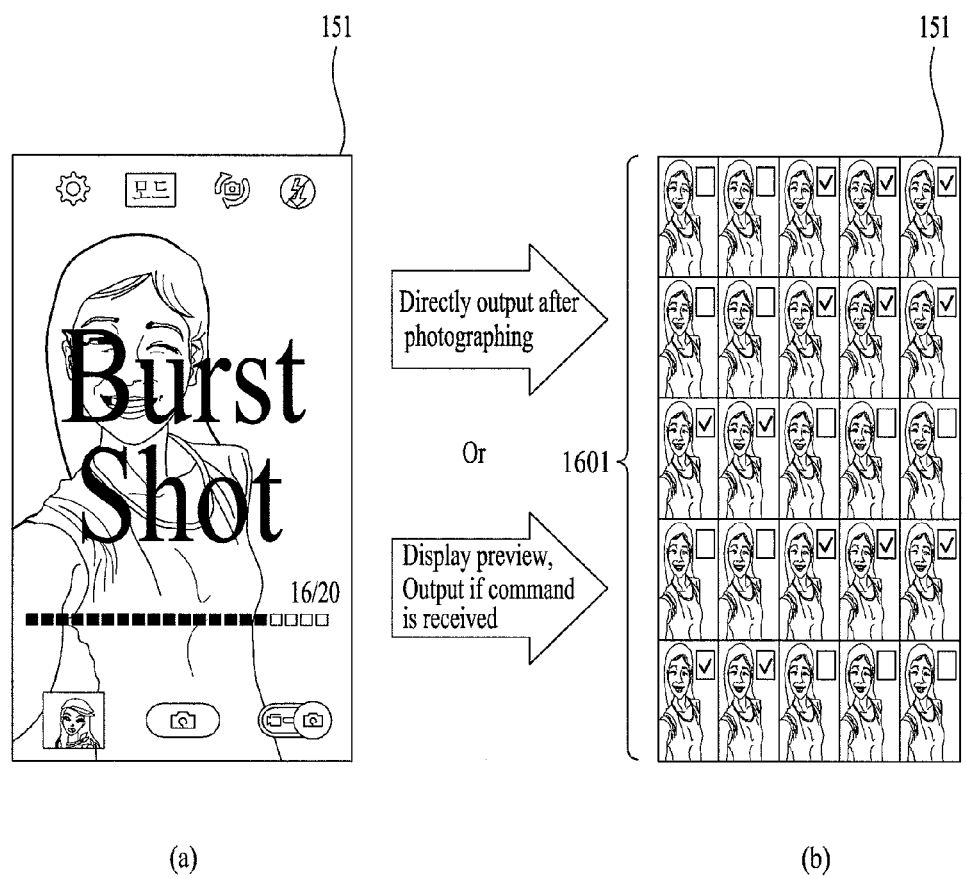

Meanwhile, if there are many photos photographed by burst shooting, like the example shown in FIG. 16, the thumbnail region 1601 may not be displayed entirely on a partial region of the touchscreen. Therefore, according to one embodiment of the present invention, referring to FIG. 17(b), the controller 180 can display the thumbnail region 1601 to a full region of the touchscreen 151.

According to one embodiment of the present invention, after a start gesture has been applied, the controller 180 enables/disables a flash function of the mobile terminal 100 in response to a detection of a prescribed gesture input. Such an embodiment will now be described in detail with reference to FIG. 18.

Figure 18:
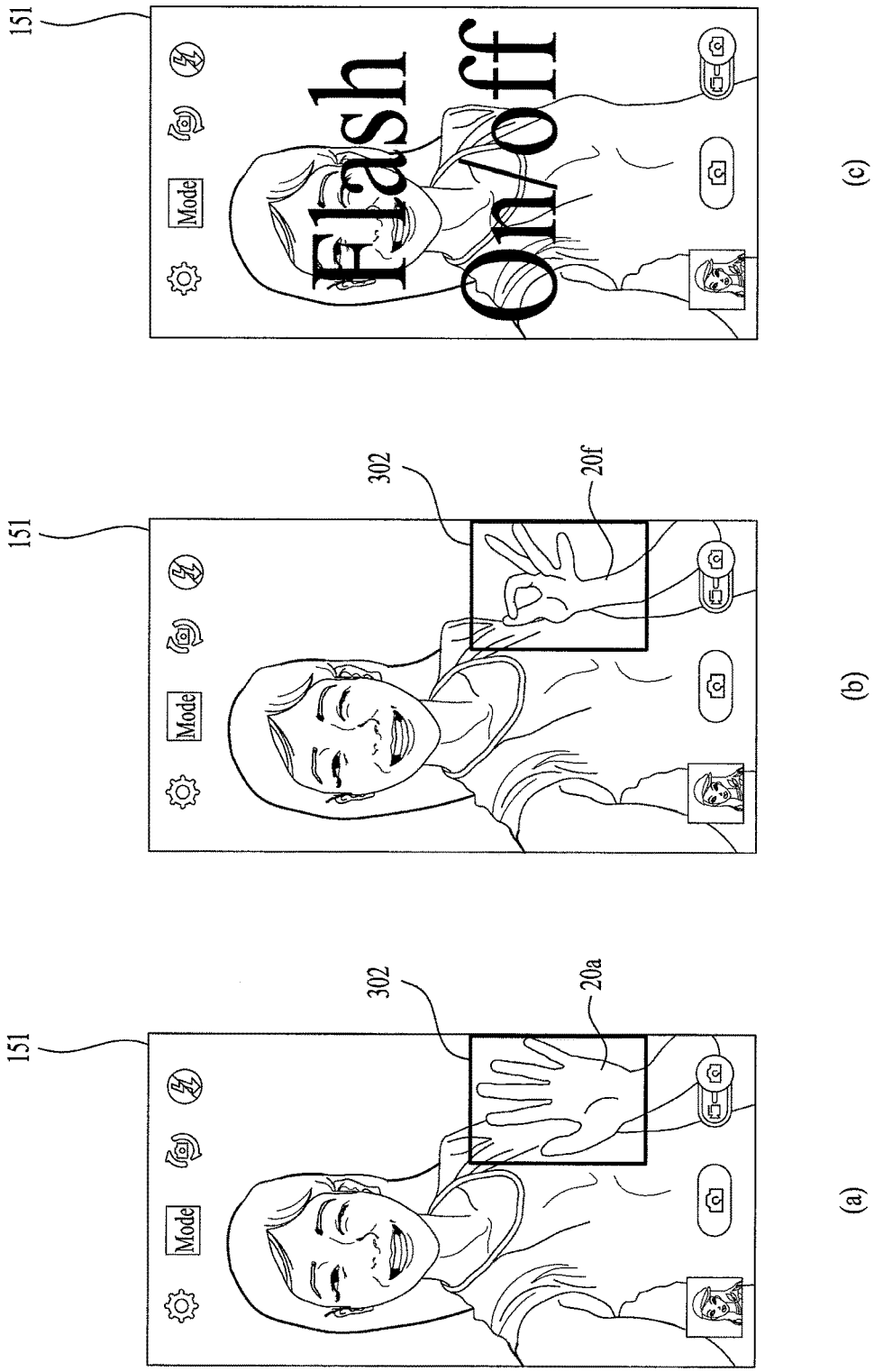
FIGS. 18(a)-(c) are diagrams illustrating a method of enabling/disabling a flash function according to one embodiment of the present invention.

In particular, FIG. 18 is a diagram illustrating a method of enabling/disabling a flash function according to one embodiment of the present invention. Referring to FIG. 18(a), the controller 180 currently displays a photographing operation configuration diagram and detects a palm gesture 20a corresponding to a user's start gesture through a preview screen. After the detection of the start gesture, if a prescribed gesture 20f is detected consecutively, the controller 180 can enable/disable a flash function of the mobile terminal 100 (FIG. 18(c)). An example of the prescribed gesture 20f includes a finger snapping gesture.

Figure 19:
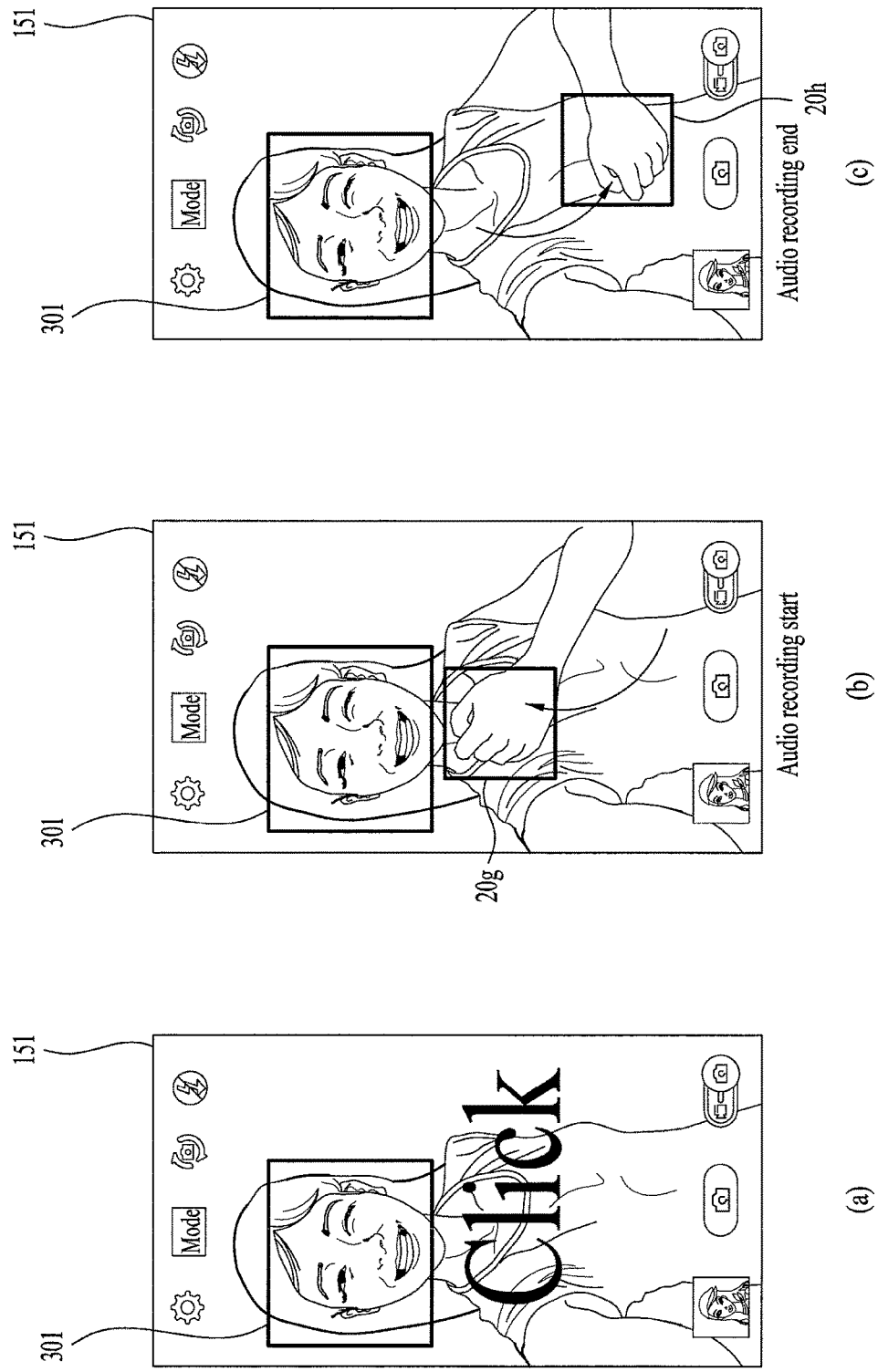
FIGS. 19(a)-(c) are diagrams illustrating a method of recording a voice in a taken photo according to one embodiment of the present invention.

Next, FIG. 19 is a diagram illustrating a method of recording a voice in a taken photo according to one embodiment of the present invention. Referring to FIG. 19(a), the controller 180 currently displays a photographing operation configuration diagram of a completed photographing operation. Thus, if an audio input gesture (i.e., a third hand gesture) is received, the controller 180 can start to record audio for a photographing operation-completed photo. In this instance, the audio input gesture may include a gesture received after a start gesture (i.e., a first hand gesture) before initiation of the photographing operation and a gesture received after an action gesture (i.e., a second hand gesture) for the photographing operation.

While the audio recognition gesture continues, the controller 180 can control the audio recording to proceed continuously. One example of the audio input gesture includes bringing a first toward a face as if a microphone is brought close to a mouth (FIG. 19(b)). Since the gesture 20g, which is performed as if a microphone is brought toward a human face, is related to an operation of recording audio, the aforementioned gesture is advantageously intuitive.

Once the audio recognition gesture is finished, the controller 180 ends the audio recording and can then save the recorded audio data to correspond to the taken image shown in FIG. 19(a). In this instance, the corresponding saving means that identification information of the image and the audio data are linked to each other in order to play the audio data together with or in association with the image when the image is viewed.

Figure 20:
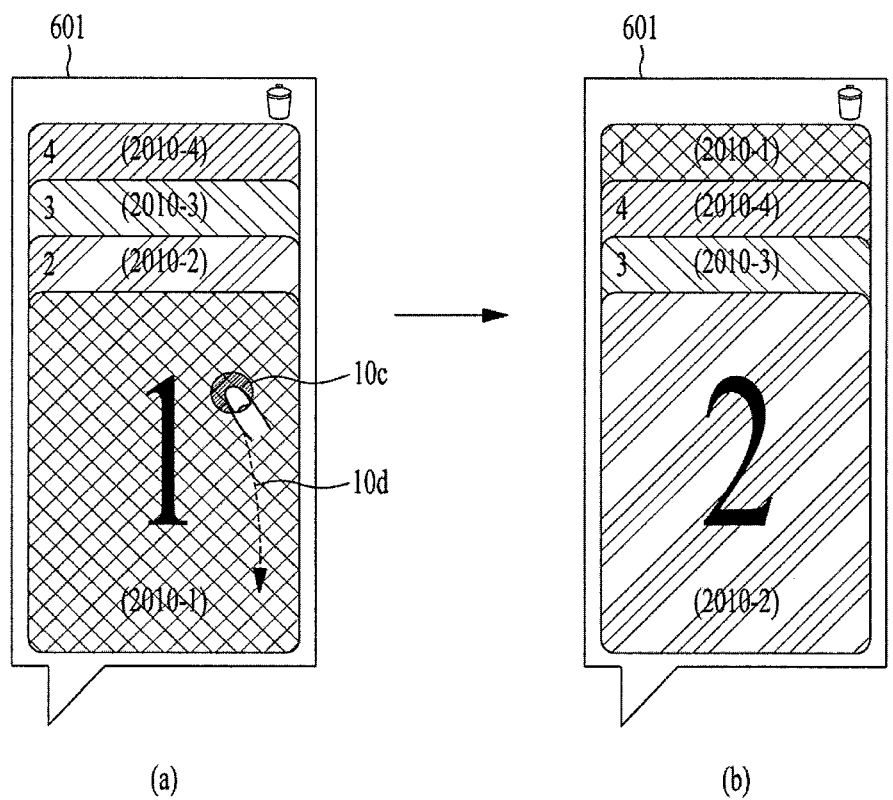
FIGS. 20(a) and (b) are diagrams illustrating a preview popup window for outputting a plurality of photos according to one embodiment of the present invention.

Next, FIG. 20 is a diagram of a preview popup window 601 for outputting a plurality of photos according to one embodiment of the present invention. According to at least one of the embodiments mentioned in the foregoing descriptions, the controller 180 displays a preview popup window 601 for a taken photo. In this instance, a preview of taken photo(s) can be provided through the preview popup window 601 when a plurality of taken photos as well as when a single taken photo.

Particularly, according to one embodiment of the present invention, the controller 180 controls the preview images 2010-1 to 2010-4, which are output through the preview popup window 601, to be switched. Referring to FIG. 20(a), the preview popup window 601 is displayed for four previously taken photos. In particular, the preview popup window 601 includes the preview images 2010-1 to 2010-4 for the four previously taken photos overlapping one another. In the example shown in FIG. 20(a), the first preview image 2010-1 is displayed to a top level.

If a user command for switching to a next image is received, the controller 180 can output the second preview image 2010-2 to the top level (FIG. 20(b)). In this instance, the user command for switching to the next image may include applying a touch 10c to prescribed point on the preview popup window 601 with a pointer and then applying a drag 10d by maintaining the touch 10c. However, the present invention is non-limited by the example of the touch. In particular, having received the user command for switching to a next image, the controller 180 sequentially switches a current image to the next image and can then output the next image as a to-level image.

Figure 21:
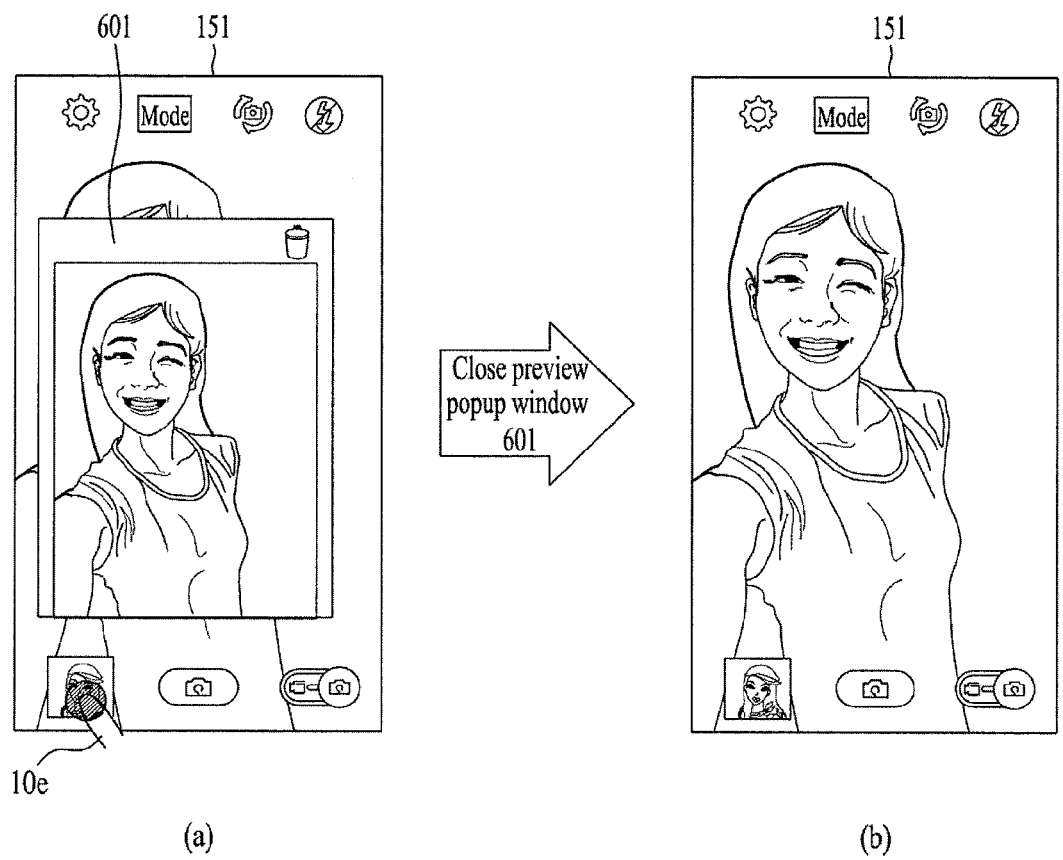
FIGS. 21(a) and (b) are diagrams illustrating a method of stopping an output of a preview popup window according to one embodiment of the present invention.

In the following description, a method of controlling a preview popup window 601 according to one embodiment of the present invention is explained in detail with reference to FIGS. 21 and 22 as follows. In particular, FIG. 21 is a diagram illustrating a method of stopping an output of a preview popup window 601 according to one embodiment of the present invention.

According to one embodiment of the present invention, in response to a reception of a command for stopping an output of a preview popup window 601, the controller 180 can return to a photographing operation configuration screen by stopping the output of the preview popup window 601.

Examples of the command for stopping the output of the preview popup window 601 include (1) applying a touch 10e to a quick view button 300b; (2) touching a region except the currently output preview popup window 601; (3) a change of an angle and/or position of the mobile terminal 100 for an additional photographing operation of a photo, and the like.

Moreover, according to one embodiment of the present invention, if a prescribed time expires after an output of the preview popup window 601, the controller 180 can automatically output a photographing operation configuration screen by stopping the output of the preview popup window 601.

Figure 22:
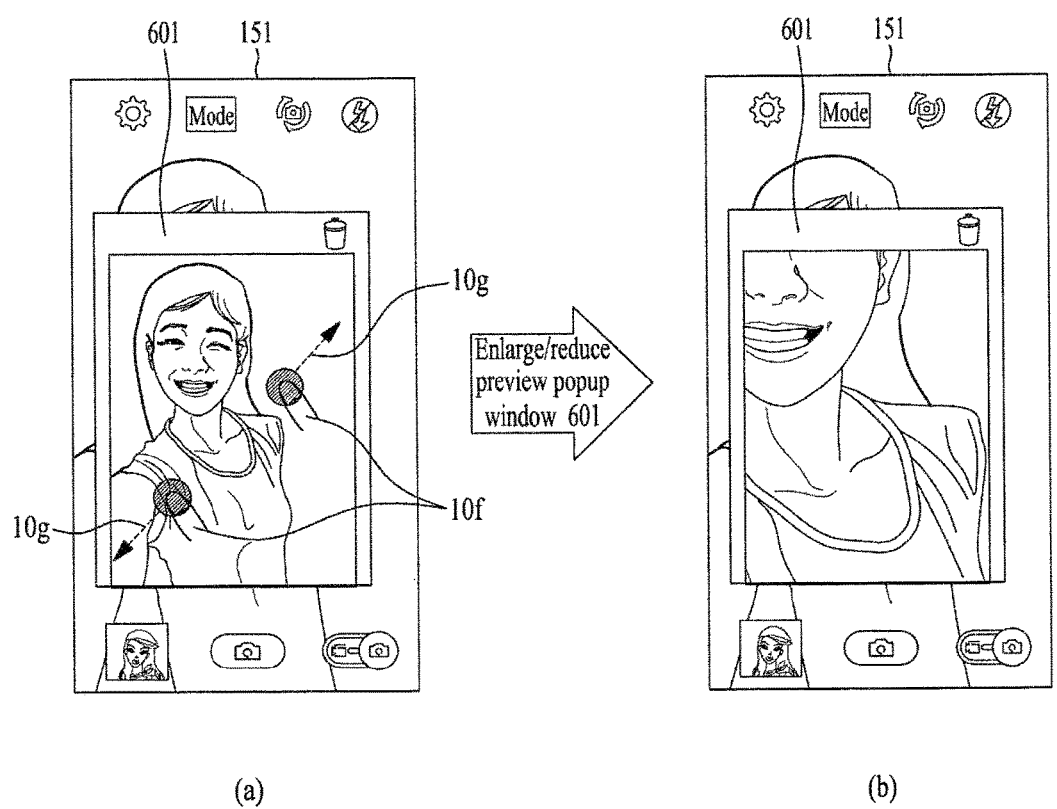
FIGS. 22(a) and (b) are diagrams illustrating a method of enlarging/reducing a preview image output through a preview popup window according to one embodiment of the present invention.

Next, FIG. 22 is a diagram illustrating a method of enlarging/reducing a preview image output through a preview popup window 601 according to one embodiment of the present invention. As shown, in response to an input of a command for enlarging/reducing a preview image output to a preview popup window 601, the controller 180 can control enlargement/reduction of the preview image.

An example of the input of the enlargement/reduction command includes a pinch-in/out input. In this instance, 'pinch-in' corresponds to dragging a plurality of pointers, which currently multi-touch the touchscreen 151, toward one another. In particular, the 'pinch-in' means a drag starting from at least one of a plurality of multi-touched points on the touchscreen so that a plurality of the multi-touched points move closer to one another.

In addition, 'pinch-out' corresponds to dragging a plurality of pointers, which currently multi-touch the touchscreen 151, to move away from one another. In particular, the 'pinch-out' corresponds to a drag starting from at least one of a plurality of multi-touched points on the touchscreen so that a plurality of the multi-touched points move away from one another.

The controller 180 controls a size of a font by recognizing a distance between the mobile terminal 100 and a user 605 and then using the recognized distance. In this instance, the distance between the mobile terminal 100 and the user 605 may mean a distance from eye(s) of the user 605.

In addition, the user can zoom in and out the preview popup window 601 by moving the terminal closer to and father away from themselves. For example, the user could zoom in on the preview popup window 601 (enlarge the image) by moving the mobile terminal 100 closer to their body and zoom out the preview popup window 601 (decrease the image) by moving the mobile terminal 100 away from their body.

Next, FIG. 23 is a diagram illustrating a method of increasing a font size in proportion to a distance between the mobile terminal 100 and the user 605 according to one embodiment of the present invention. Referring to FIG. 23, assume that a user has set a font size regarded as appropriate for reading. If the mobile terminal 100 is spaced apart from eyes of the user 605, the font size relatively decreases in a range of vision of the user 605. Because the decreasing font size differs from the font size desired by the user 605, the controller 180 increases a font size according to one embodiment of the present invention.

In particular, referring to FIG. 23 (*a*), when the controller 180 displays a text data, if the distance between the mobile terminal 100 and the user 605 is relatively short, the controller 180 controls a relatively small font size to be output. If the distance between the mobile terminal 100 and the user 605 is relatively long, the controller 180 controls a relatively large font size to be output.

FIG. 24 is a diagram illustrating a method of increasing a font size in inverse proportion to a distance between the mobile terminal 100 and the user 605 according to one embodiment of the present invention. FIG. 24 illustrates adjusting a font size in a manner inverse to that shown in FIG. 23. While the user 605 is reading text data through the mobile terminal 100, and if the letters are viewed unclearly, the user 605 may bring the mobile terminal 100 closer to their eyes. Hence, the controller 180 can adjust the font size to be a larger size so that the user 605 can read the text data more clearly.

When the controller 180 displays a text data, if a distance between the mobile terminal 100 and the user 605 is relatively short, the controller 180 controls a relatively large font size to be output. If the distance between the mobile terminal 100 and the user 605 is relatively long, the controller 180 controls a relatively small font size to be output.

Accordingly, embodiments of the present invention provide the following advantages. First, embodiments of the present invention facilitate a control of a photographing operation using a user's gesture. Secondly, embodiments of the present invention provide a method using a user's gesture, thereby providing a more intuitive method.

According to one embodiment of the present invention, the above-described methods can be implemented in a program recorded medium as processor-readable (or computer-readable) codes. The processor-readable media include all kinds of recording devices in which data readable by a processor (or computer) are saved. The processor-readable media include ROM, RAM, CD-ROM, magnetic tapes, floppy discs, optical data storage devices, and the like for example and also include carrier-wave type implementations (e.g., transmission via Internet). In addition, the processor may include the controller 180 of the terminal.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
a wireless communication processor configured to provide wireless communication;
a sensor;
a camera;
a touch screen;
a memory; and
a controller configured to:
display a preview screen obtained through the camera on the touch screen,
receive a first user gesture for capturing an image corresponding to the preview screen,
capture the image corresponding to the preview screen after a predetermined time period from receiving the first user gesture, and
display a preview pop-up window including the captured image overlaid on the preview screen,
wherein the preview screen includes a current image obtained by the camera, and
wherein the controller is further configured to:
determine whether the mobile terminal satisfies a preset condition,
if the mobile terminal satisfies the preset condition, stop displaying the pop-up window in response to the preset condition and receive a second user gesture for capturing the current image obtained by the camera,
capture the current image obtained by the camera after the predetermined time period from receiving the second user gesture,
display another preview pop-up window including the captured image overlaid on the preview screen,
sense a first position of the mobile terminal when receiving the first and second user gestures,
display the preview pop-up window including the captured image when the mobile terminal is moved to a second position different than the first position, and
capture another image when the mobile terminal is moved back to the first position from the second position without having to receive a user gesture.

2. The mobile terminal of claim 1, wherein the first user gesture comprises a still hand gesture and the second user gesture comprises a continuous hand gesture from the still hand gesture.

3. The mobile terminal of claim 1, wherein the controller is further configured to:
display a gesture indicator on the touch screen indicating the first user gesture or the second user gesture is recognized by the controller.

4. The mobile terminal of claim 1, wherein the controller is further configured to:
display control buttons on the touch screen for controlling options of the camera, receive a command to remove the displayed control buttons, and stop displaying the control buttons when receiving the command.

5. The mobile terminal of claim 1, wherein the controller is further configured to:

display a countdown indicator on the touch screen counting down the predetermined time period until the image is captured.

6. The mobile terminal of claim 2, wherein the controller is further configured to:

sense a first position of the mobile terminal when receiving the first and second user gestures, and capture another image when the mobile terminal is maintained in the first position after capturing the image.

7. The mobile terminal of claim 2, wherein the controller is further configured to:

receive a third user gesture, and perform an additional camera operation based on the received third user gesture.

8. The mobile terminal of claim 7, wherein the third user gesture includes a number of fingers being extended, and the additional camera operation includes capturing a number of images corresponding to the number of fingers extended in the third user gesture.

9. The mobile terminal of claim 2, further comprising:

another camera on a back side of the mobile terminal opposite to the touch screen; and a light emitting element mounted on the back side of the mobile terminal, wherein the controller is further configured to:

control the light emitting element to emit a first light indicating the first user gesture is recognized, and control the light emitting element to emit a second light indicating the first user gesture is not recognized.

10. A method of controlling a mobile terminal, the method comprising:

displaying, via a touch screen of the mobile terminal, a preview screen obtained through a camera of the mobile terminal;

receiving, via a controller of the mobile terminal, a first user gesture for capturing an image corresponding to the preview screen;

capturing, via the controller, the image corresponding to the preview screen after a predetermined time period from receiving the first user gesture;

displaying a preview pop-up window including the captured image overlaid on the preview screen, wherein the preview screen includes a current image obtained by the camera;

determining whether the mobile terminal satisfies a preset condition;

if the mobile terminal satisfies the preset condition, stopping displaying the pop-up window in response to the preset condition and receiving, via the controller, a second user gesture for capturing the current image obtained by the camera;

capturing, via the controller, the current image obtained by the camera after a predetermined time period from receiving the second user gesture;

displaying another preview pop-up window including the captured image, overlaid on the preview screen;

sensing, via a sensor of the mobile terminal, a first position of the mobile terminal when receiving the first and second user gestures;

displaying the preview pop-up window including the captured image when the mobile terminal is moved to a second position different than the first position; and capturing another image when the mobile terminal is moved back to the first position from the second position without having to receive a user gesture.

11. The method of claim 10, wherein the user gesture includes a first user gesture comprising a still hand gesture and a second user gesture comprising a continuous hand gesture from the still hand gesture.

12. The method of claim 11, further comprising:

displaying a gesture indicator on a touch screen indicating the first user gesture or the second user gesture is recognized by the controller.

13. The method of claim 10, further comprising:

displaying control buttons on a touch screen for controlling options of the camera;

receiving a command to remove the displayed control buttons; and stopping display of the control buttons when receiving the command.

14. The mobile terminal of claim 1, wherein the current image displayed in the another pop-up window includes a first image and the current image displayed in the pop-up window includes a second image, wherein the first image is displayed larger than the second image, wherein the first image and the preview image are displayed together on the touch screen, and wherein the first image is displayed above the second image.

15. The mobile terminal of claim 1, wherein the preview pop-up window includes a delete icon for deleting the captured image.

16. The mobile terminal of claim 15, wherein the controller is further configured to delete the captured image in response to a selection of the delete icon without executing a gallery application.

17. The mobile terminal of claim 1, wherein the preset condition for stopping display of the pop-up window corresponds to a prescribed time expiring after the display of the preview image.

18. The mobile terminal of claim 1, wherein the current image displayed in the another pop-up window includes a first image and the current image displayed in the pop-up window includes a second image corresponding to a thumbnail image, and wherein the first image displayed in the another pop-up window is displayed to overlay more of the preview screen than the second image displayed as the thumbnail image overlays the preview screen.

* * * * *